United States Patent
Gopalakrishna et al.

(10) Patent No.: US 11,218,632 B2
(45) Date of Patent: Jan. 4, 2022

(54) RETRACTABLE PANORAMIC CAMERA MODULE

(71) Applicant: QUALCOMM Incorporated, San Diego, CA (US)

(72) Inventors: Shankar Gopalakrishna, Bangalore (IN); Saju Cheeran Verghese Francis, Bangalore (IN); Praveensingh Rajput, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/671,905

(22) Filed: Nov. 1, 2019

(65) Prior Publication Data
US 2021/0136284 A1 May 6, 2021

(51) Int. Cl.
*H04N 7/18* (2006.01)
*H04N 5/232* (2006.01)
*H04N 5/225* (2006.01)

(52) U.S. Cl.
CPC ....... *H04N 5/23238* (2013.01); *H04N 5/2252* (2013.01); *H04N 5/2257* (2013.01); *H04N 5/23299* (2018.08)

(58) Field of Classification Search
CPC .................................................. H04N 5/23238
USPC .......................................................... 348/38
See application file for complete search history.

(56) References Cited

U.S. PATENT DOCUMENTS

| | | | | |
|---|---|---|---|---|
| 4,577,827 A | * | 3/1986 | Eliscu | F16M 11/08 248/183.4 |
| 4,640,481 A | * | 2/1987 | Kohno | F16M 11/10 248/126 |
| 4,866,430 A | * | 9/1989 | Chek | H05B 45/37 345/82 |
| 4,999,713 A | * | 3/1991 | Ueno | H04N 13/296 348/240.3 |
| 5,434,617 A | * | 7/1995 | Bianchi | G01S 3/7865 348/169 |

(Continued)

FOREIGN PATENT DOCUMENTS

| | | |
|---|---|---|
| CN | 107592438 A | 1/2018 |
| CN | 207968579 U | 10/2018 |
| CN | 109672785 A | 4/2019 |

OTHER PUBLICATIONS

Avinash A., "World's First Smartphone With Built-In 360-Degree VR Camera Unveiled," Oct. 25, 2017, 4 pages, retrieved from the URL: https://techlog360.com/first-smartphone-built-360-degree-vr-camera/.

(Continued)

*Primary Examiner* — Leron Beck
(74) *Attorney, Agent, or Firm* — Polsinelli/Qualcomm

(57) ABSTRACT

A mobile device includes a camera module that can alternate between a retracted state and an extended state. In the retracted state, the camera module is retracted into a recess in a housing of the mobile device. In the extended state, the camera module extends from the housing. While in the extended state, one or more cameras of the camera module capture images. A processor of the mobile device stitches the images into a panoramic image that optionally provides a 360 degree view. While in the extended state, the camera module may optionally rotate or fold.

23 Claims, 18 Drawing Sheets

(56) References Cited

U.S. PATENT DOCUMENTS

| | | | | |
|---|---|---|---|---|
| 5,517,236 A * | 5/1996 | Sergeant | G08B 13/19626 | 348/143 |
| 5,537,251 A * | 7/1996 | Shimada | G09G 3/025 | 359/462 |
| 5,612,732 A * | 3/1997 | Yuyama | H04N 1/0044 | 348/14.01 |
| 5,947,359 A * | 9/1999 | Yoshie | B60R 11/0241 | 224/552 |
| 6,029,073 A * | 2/2000 | Lebby | G02B 23/18 | 345/1.1 |
| 6,069,593 A * | 5/2000 | Lebby | G06F 3/1423 | 345/1.1 |
| 6,076,978 A * | 6/2000 | McIlvenna | G03B 17/38 | 396/425 |
| 6,157,379 A * | 12/2000 | Singh | G06F 3/04886 | 345/173 |
| 6,160,607 A * | 12/2000 | Diaconu | G02B 7/30 | 352/139 |
| 6,226,351 B1 * | 5/2001 | Snoeren | H04N 5/32 | 348/E5.086 |
| 6,388,571 B1 * | 5/2002 | Kirino | G08B 13/19691 | 340/541 |
| 6,392,694 B1 * | 5/2002 | Bianchi | H04N 7/181 | 348/169 |
| 6,421,069 B1 * | 7/2002 | Ludtke | G06F 9/4415 | 715/762 |
| 6,445,293 B1 * | 9/2002 | Alonso | G06Q 20/389 | 340/541 |
| 6,512,670 B1 * | 1/2003 | Boehme | G06F 1/1616 | 312/223.2 |
| 6,747,610 B1 * | 6/2004 | Taima | G09G 3/003 | 345/6 |
| 6,781,635 B1 * | 8/2004 | Takeda | H04M 1/72527 | 348/552 |
| 6,819,355 B1 * | 11/2004 | Niikawa | H04N 1/00204 | 348/207.11 |
| 6,853,809 B2 * | 2/2005 | Pelletier | G08B 13/19628 | 348/159 |
| 6,992,733 B1 * | 1/2006 | Klein | G02B 6/0021 | 349/58 |
| 7,103,698 B2 * | 9/2006 | Zhang | G06F 1/1632 | 361/679.3 |
| 7,109,990 B1 * | 9/2006 | Oler | G09G 3/3611 | 345/101 |
| 7,221,395 B2 * | 5/2007 | Kinjo | H04N 1/3872 | 348/239 |
| 7,376,441 B2 * | 5/2008 | Lee | H04M 1/72527 | 341/176 |
| 7,379,664 B2 * | 5/2008 | Marcus | G03B 17/38 | 348/211.11 |
| 7,418,275 B2 * | 8/2008 | Yiu | H04M 1/021 | 455/550.1 |
| 7,429,988 B2 * | 9/2008 | Gonsalves | G06F 3/0481 | 345/157 |
| 7,460,781 B2 * | 12/2008 | Kanai | H04N 5/23203 | 348/211.3 |
| 7,477,919 B2 * | 1/2009 | Warren | H04M 1/7253 | 455/557 |
| 7,495,694 B2 * | 2/2009 | Cutler | H04N 5/2259 | 348/218.1 |
| 7,526,586 B2 * | 4/2009 | Huber | G06F 1/1616 | 710/72 |
| 7,636,132 B2 * | 12/2009 | Sakamoto | H04L 29/06027 | 348/723 |
| 7,643,066 B2 * | 1/2010 | Henninger, III | G06K 9/00771 | 348/211.99 |
| 7,835,736 B2 * | 11/2010 | Larocca | H04L 12/185 | 455/418 |
| 7,869,117 B2 * | 1/2011 | Choi | G02F 1/167 | 359/296 |
| 7,911,493 B2 * | 3/2011 | Sarma | H04M 1/7253 | 348/14.01 |
| 8,077,243 B2 * | 12/2011 | Morita | G06F 3/0483 | 348/333.01 |
| 8,180,410 B2 * | 5/2012 | Kim | H04M 1/0266 | 345/32 |
| 8,233,090 B2 * | 7/2012 | Chun | H04H 60/80 | 348/552 |
| 8,284,288 B2 * | 10/2012 | Kitamori | H04N 5/772 | 348/211.5 |
| 8,300,086 B2 * | 10/2012 | Pockett | H04N 13/246 | 348/42 |
| 8,311,513 B1 * | 11/2012 | Nasserbakht | G06Q 10/109 | 455/410 |
| 8,325,239 B2 * | 12/2012 | Kaplan | H04N 5/2252 | 348/207.1 |
| 8,350,923 B2 * | 1/2013 | Nakayama | B60R 1/00 | 340/937 |
| 8,619,021 B2 * | 12/2013 | Hayton | G06F 3/0412 | 345/107 |
| 8,659,666 B2 * | 2/2014 | Ishibashi | H04N 21/4425 | 348/207.1 |
| 8,675,071 B1 * | 3/2014 | Slavin | H04M 11/04 | 348/143 |
| 9,380,207 B1 | 6/2016 | Kozko | | |
| 10,645,285 B2 * | 5/2020 | Yang | H04N 7/183 | |
| 2002/0094845 A1 | 7/2002 | Inasaka | H04M 1/6066 | 455/566 |
| 2003/0049896 A1 * | 3/2003 | Chen | H01L 27/14689 | 438/200 |
| 2003/0155413 A1 * | 8/2003 | Kovesdi | G06F 16/954 | 235/375 |
| 2003/0226951 A1 * | 12/2003 | Ye | G03F 7/7085 | 250/208.1 |
| 2004/0017479 A1 * | 1/2004 | Nakakubo | H04N 5/2251 | 348/207.99 |
| 2004/0227840 A1 * | 11/2004 | Houlberg | H04N 5/23203 | 348/345 |
| 2004/0263659 A1 * | 12/2004 | Abe | H04N 5/23293 | 348/333.01 |
| 2005/0157195 A1 * | 7/2005 | Ohashi | H04M 1/0214 | 348/333.06 |
| 2006/0061951 A1 * | 3/2006 | Hara | G06F 1/1626 | 361/679.22 |
| 2006/0114987 A1 * | 6/2006 | Roman | H04N 19/132 | 375/240.01 |
| 2006/0187312 A1 * | 8/2006 | Labaziewicz | H04N 5/2258 | 348/218.1 |
| 2006/0259942 A1 * | 11/2006 | Toyama | H04M 1/72527 | 725/133 |
| 2007/0010200 A1 * | 1/2007 | Kaneko | H04W 76/14 | 455/41.2 |
| 2007/0146528 A1 * | 6/2007 | Yanagi | H04N 5/23222 | 348/333.01 |
| 2007/0248260 A1 * | 10/2007 | Pockett | H04N 13/327 | 382/154 |
| 2007/0279481 A1 * | 12/2007 | Chambers | H04N 5/23238 | 348/14.01 |
| 2008/0002023 A1 * | 1/2008 | Cutler | G06T 7/97 | 348/36 |
| 2008/0024596 A1 * | 1/2008 | Li | H04N 21/42204 | 348/47 |
| 2008/0024614 A1 * | 1/2008 | Li | H04N 13/296 | 348/207.99 |
| 2008/0064437 A1 * | 3/2008 | Chambers | H04N 1/00307 | 455/556.1 |
| 2008/0136990 A1 * | 6/2008 | Kimura | H01L 27/1218 | 349/46 |
| 2008/0147730 A1 * | 6/2008 | Lee | G06Q 30/0212 | |
| 2008/0165248 A1 * | 7/2008 | Wang | H04N 5/3651 | 348/76 |
| 2008/0179402 A1 * | 7/2008 | Barkan | G06K 7/10722 | 235/462.41 |
| 2008/0214239 A1 * | 9/2008 | Hashimoto | G06F 3/0481 | 455/557 |
| 2008/0219654 A1 * | 9/2008 | Border | H04N 5/23212 | 396/89 |

(56) References Cited

U.S. PATENT DOCUMENTS

| | | | | |
|---|---|---|---|---|
| 2008/0239170 A1* | 10/2008 | Klosowiak | ............ | H04N 9/3102 348/744 |
| 2008/0303888 A1* | 12/2008 | Hansson | ................ | H04N 7/147 348/14.02 |
| 2009/0003630 A1* | 1/2009 | Kuroda | .................... | H04R 1/02 381/150 |
| 2009/0086015 A1* | 4/2009 | Larsen | .................... | F41G 3/165 348/46 |
| 2009/0096913 A1* | 4/2009 | Wang | ..................... | G03B 13/36 348/345 |
| 2009/0186603 A1* | 7/2009 | Usami | ................. | H04M 1/2757 455/414.2 |
| 2010/0026720 A1* | 2/2010 | Hotta | ..................... | G06F 1/1622 345/652 |
| 2010/0177111 A1* | 7/2010 | Abe | ...................... | G09G 3/3406 345/589 |
| 2010/0220991 A1* | 9/2010 | Yamakose | .............. | G03B 17/56 396/419 |
| 2010/0270970 A1* | 10/2010 | Toya | ........................ | H02J 50/60 320/108 |
| 2011/0091195 A1* | 4/2011 | Goldberg | ................ | G03B 17/56 396/419 |
| 2011/0095999 A1* | 4/2011 | Hayton | ................. | G06F 3/0412 345/173 |
| 2011/0216166 A1* | 9/2011 | Takahashi | .............. | H04N 13/20 348/46 |
| 2011/0310243 A1* | 12/2011 | Fuhrmann | ........... | G01N 21/9036 348/92 |
| 2012/0090004 A1* | 4/2012 | Jeong | .................... | H04N 21/482 725/39 |
| 2012/0171656 A1* | 7/2012 | Shen | ........................ | G09B 5/14 434/365 |
| 2012/0212409 A1* | 8/2012 | Abe | .................... | H04N 5/23203 345/156 |
| 2012/0218379 A1* | 8/2012 | Ozcan | .................. | G03H 1/0866 348/40 |
| 2013/0057762 A1* | 3/2013 | Yoshida | ............. | H04N 21/4786 348/552 |
| 2015/0181006 A1 | 6/2015 | Li | | |
| 2015/0189175 A1 | 7/2015 | Fan et al. | | |
| 2015/0288880 A1* | 10/2015 | Chen | .................... | H04N 5/2259 348/36 |
| 2016/0286119 A1 | 9/2016 | Rondinelli | | |
| 2017/0126979 A1* | 5/2017 | Evans, V | ............. | H04M 1/0264 |
| 2017/0163889 A1* | 6/2017 | Evans, V | ............ | H04N 1/00307 |
| 2017/0176843 A1* | 6/2017 | Yamakose | ........... | H04N 5/2252 |
| 2018/0091716 A1* | 3/2018 | Brand | .................. | H04N 5/2257 |
| 2018/0150989 A1 | 5/2018 | Mitsui et al. | | |
| 2019/0020850 A1* | 1/2019 | Meyers | ................ | H04N 5/2173 |
| 2019/0166236 A1 | 5/2019 | Zeng | | |

OTHER PUBLICATIONS

International Search Report and Written Opinion—PCT/US2020/055972—ISA/EPO—dated Dec. 9, 2020.

* cited by examiner

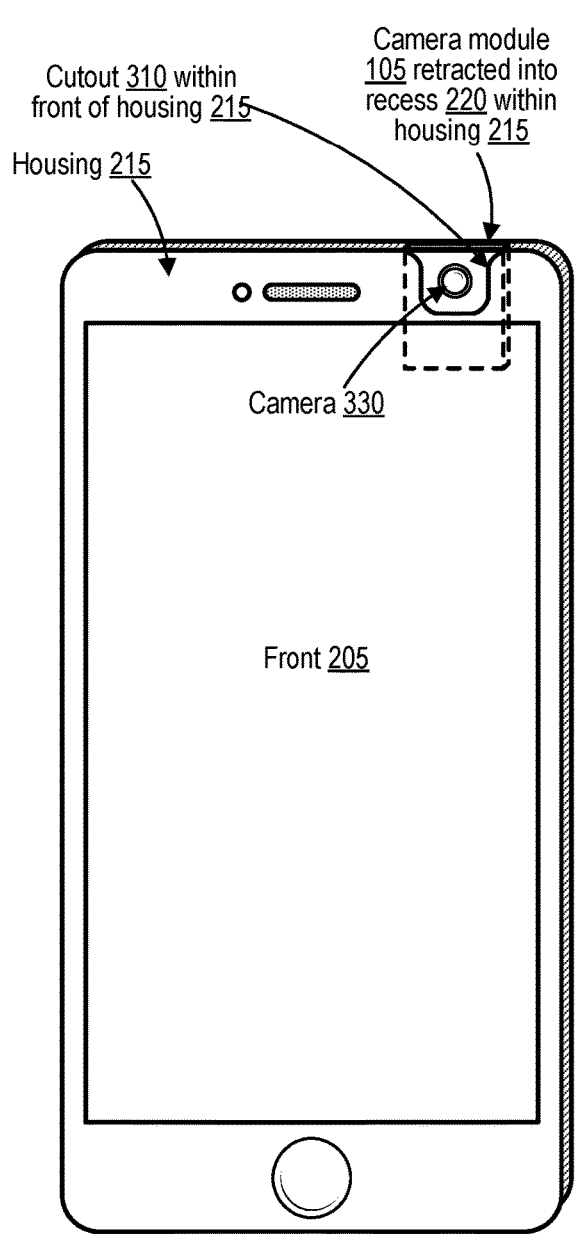
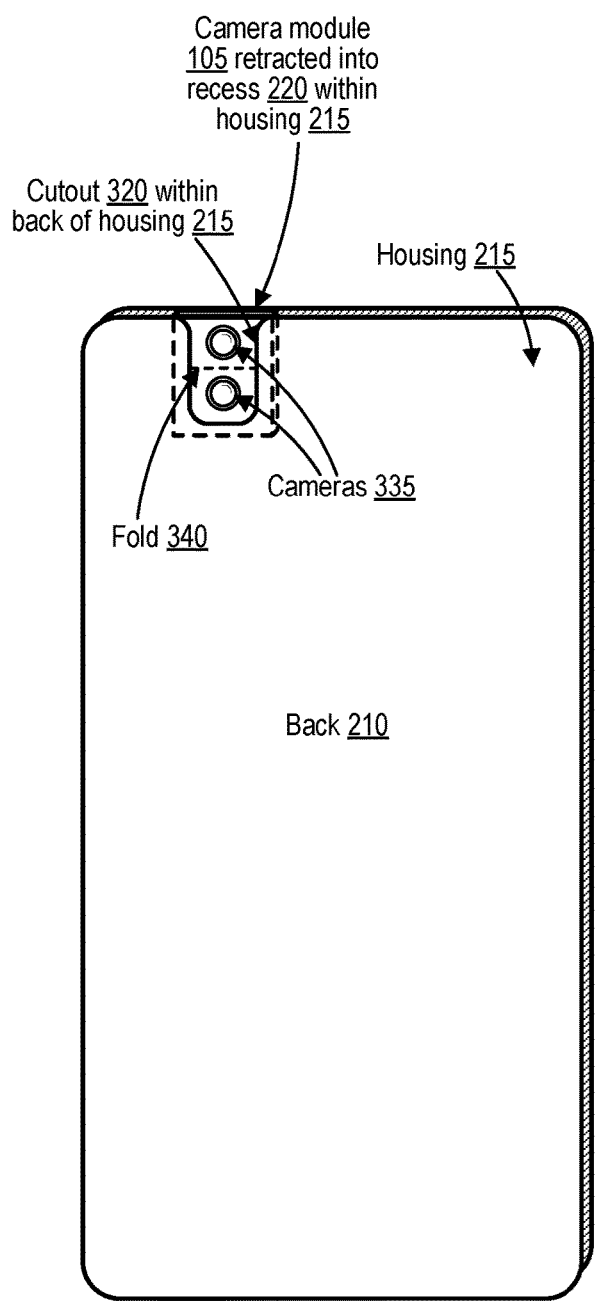
FIG. 3A
FIG. 3B

RETRACTABLE PANORAMIC CAMERA MODULE

FIELD

The present disclosure generally relates to panoramic cameras, and more specifically to panoramic camera modules that are capable of retracting into a mobile device or extending from the mobile device.

BACKGROUND

A digital camera is a device that captures images and stores the captured images on a computer-readable storage medium. Mobile devices, such as cellular telephones, sometimes include digital cameras. Since mobile devices are generally intended to be portable, space within and along the exterior of mobile devices is at a premium.

Panoramic stitching techniques are used to stitch multiple images captured by one or more cameras into a single, larger panoramic image. The resulting panoramic image includes a field of view that is larger than the field of view of each of the multiple images that were stitched together to form the panoramic image. Typically, a user of a camera physically moves the camera around to point the camera in different directions for a period of time, during which the multiple images are captured, and after which those multiple images are stitched together to form the panoramic image.

While this technique is useful in that it only requires one camera and no other specialized hardware, the panoramic images that are produced often include undesirable artifacts. Because a user must physically move the camera using this technique, the images captured by the camera can sometimes include artifacts, such as motion blur, warping, or distortion. Such artifacts, along with variations in the speed of the user's movements, can also negatively impact the ability to stitch the resulting images together, often resulting in a panoramic image that includes areas that are poorly stitched together and appear squished, stretched, have missing features, or are otherwise warped or distorted. Furthermore, since the multiple images are captured over a period of time using this technique, movements of objects or individuals within the photographed scene during that period of time, such as movements of an individual walking or running across the photographed scene, can cause the moving individual or object to appear multiple times in the resulting panoramic image, to be missing from the resulting panoramic image, or to appear warped or distorted within the resulting panoramic image.

SUMMARY

Techniques and systems are described herein for image processing. A mobile device includes a camera module that can alternate between a retracted state and an extended state. In the retracted state, the camera module is retracted into a recess in a housing of the mobile device. In the extended state, the camera module extends from the housing. While in the extended state, one or more cameras of the camera module capture images. A processor of the mobile device stitches the images into a panoramic image that optionally provides a 360 degree view. While in the extended state, the camera module may optionally rotate or fold.

In one example, a method of processing images is provided that includes activating a mechanism that moves a camera module of a mobile device from a retracted state to an extended state. The camera module is retracted into a housing of the mobile device while in the retracted state. The camera module extends from the housing of the mobile device in the extended state. The method also includes capturing a plurality of images using one or more cameras of the camera module while the camera module is in the extended state. The method also includes stitching the plurality of images into a panoramic image.

In some cases, the panoramic image is a 360 degree image that includes image data corresponding to at least a 360 degree area around the camera module. In some cases, the one or more cameras of the camera module include at least a first camera facing a first direction and a second camera facing a second direction, the second direction parallel to and opposing the first direction. In some cases, a first camera of the one or more cameras of the camera module includes at least one of a wide-angle lens, an ultra-wide-angle lens, or a fisheye lens. In some cases, the mechanism includes a spring. Activating the mechanism includes causes the spring to expand from a condensed state. In some cases, the mechanism includes a motor. Activating the mechanism includes actuating the motor. Actuation of the motor moves the camera module from the retracted state to the extended state. In some cases, the method may also include transmitting the panoramic image to a computing device via a wireless communication transceiver.

In some cases, the method also includes activating a motor while the camera module is in the extended state. The motor rotates a portion of the camera module that includes at least a first camera of the one or more cameras. A first image of the plurality of images is captured by the first camera while the portion of the camera module is at a first rotation orientation. A second image of the plurality of images is captured by the first camera while the portion of the camera module is at a second rotation orientation different from the first rotation orientation. In some cases, the camera module folds from an unfolded state into a folded state after the camera module moves from the retracted state to the extended state. A first camera of the one or more cameras of the camera module faces a different direction when the camera module is in the unfolded state than when the camera module is in the folded state. In some cases, the method also includes, after capturing the plurality of images, transitioning the camera module from the extended state to the retracted state by causing the camera module to be moved into the housing of the mobile device. In some cases, the method also includes activating a second mechanism that moves the camera module of the mobile device from the extended state to the retracted state.

In another example, an apparatus for processing images includes a housing with a recess, a camera module, and a mechanism that moves a camera module from a retracted state to an extended state. The camera module is retracted into the recess while in the retracted state. The camera module extends from the housing in the extended state. The camera module includes one or more cameras that capture a plurality of images while the camera module is in the extended state. The apparatus also includes one or more memory components that store instructions. The apparatus also includes one or more processors. Execution of the instructions by the one or more processors causes the one or more processors to stitch the plurality of images into a panoramic image.

In some cases, the panoramic image is a 360 degree image that includes image data corresponding to at least a 360 degree area around the camera module. In some cases, the one or more cameras of the camera module include at least a first camera facing a first direction and a second camera facing a second direction, the second direction parallel to and opposing the first direction. In some cases, a first camera of the one or more cameras of the camera module includes at least one of a wide-angle lens, an ultra-wide-angle lens, or a fisheye lens. In some cases, the mechanism includes a spring. Activating the mechanism includes causes the spring to expand from a condensed state. In some cases, the mechanism includes a motor. Activating the mechanism includes actuating the motor. Actuation of the motor moves the camera module from the retracted state to the extended state. In some cases, the apparatus also includes a wireless communication transceiver that transmits the panoramic image to a computing device.

In some cases, the apparatus also includes a motor. Activating the motor while the camera module is in the extended state rotates a portion of the camera module that includes at least a first camera of the one or more cameras. A first image of the plurality of images is captured by the first camera while the portion of the camera module is at a first rotation orientation. A second image of the plurality of images is captured by the first camera while the portion of the camera module is at a second rotation orientation different from the first rotation orientation. In some cases, the camera module folds from an unfolded state into a folded state after the camera module moves from the retracted state to the extended state. A first camera of the one or more cameras of the camera module faces a different direction when the camera module is in the unfolded state than when the camera module is in the folded state. In some cases, the mechanism is configured to, after capturing the plurality of images, transition the camera module from the extended state to the retracted state by causing the camera module to be moved into the housing. In some cases, the apparatus includes a second mechanism that moves the camera module from the extended state to the retracted state.

In another example, a non-transitory computer-readable medium is provided having stored thereon instructions that, when executed by one or more processors, cause the one or more processor to: activate a mechanism that moves a camera module from a retracted state to an extended state, wherein the camera module is retracted into a housing while in the retracted state, wherein the camera module extends from the housing in the extended state; capture a plurality of images using one or more cameras of the camera module while the camera module is in the extended state; and stitch the plurality of images into a panoramic image.

In some cases, the panoramic image is a 360 degree image that includes image data corresponding to at least a 360 degree area around the camera module. In some cases, the one or more cameras of the camera module include at least a first camera facing a first direction and a second camera facing a second direction, the second direction parallel to and opposing the first direction. In some cases, a first camera of the one or more cameras of the camera module includes at least one of a wide-angle lens, an ultra-wide-angle lens, or a fisheye lens. In some cases, the mechanism includes a spring. Activating the mechanism includes causes the spring to expand from a condensed state. In some cases, the mechanism includes a motor. Activating the mechanism includes actuating the motor. Actuation of the motor moves the camera module from the retracted state to the extended state. In some cases, the instructions, when executed by the one or more processors, cause the one or more processors to also transmit the panoramic image to a computing device via a wireless communication transceiver.

In some cases, the instructions, when executed by the one or more processors, cause the one or more processors to also activate a motor while the camera module is in the extended state. The motor rotates a portion of the camera module that includes at least a first camera of the one or more cameras. A first image of the plurality of images is captured by the first camera while the portion of the camera module is at a first rotation orientation. A second image of the plurality of images is captured by the first camera while the portion of the camera module is at a second rotation orientation different from the first rotation orientation. In some cases, the camera module folds from an unfolded state into a folded state after the camera module moves from the retracted state to the extended state. A first camera of the one or more cameras of the camera module faces a different direction when the camera module is in the unfolded state than when the camera module is in the folded state. In some cases, after capturing the plurality of images, the camera module transitions from the extended state to the retracted state by moving into the housing. In some cases, the instructions, when executed by the one or more processors, cause the one or more processor to also activate a second mechanism that moves the camera module of the mobile device from the extended state to the retracted state.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 3A illustrates a front view of a mobile device with a retracted camera module and a housing with camera cutouts;

FIG. 3B illustrates a back view of the mobile device of FIG. 3A;

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Figure 1:
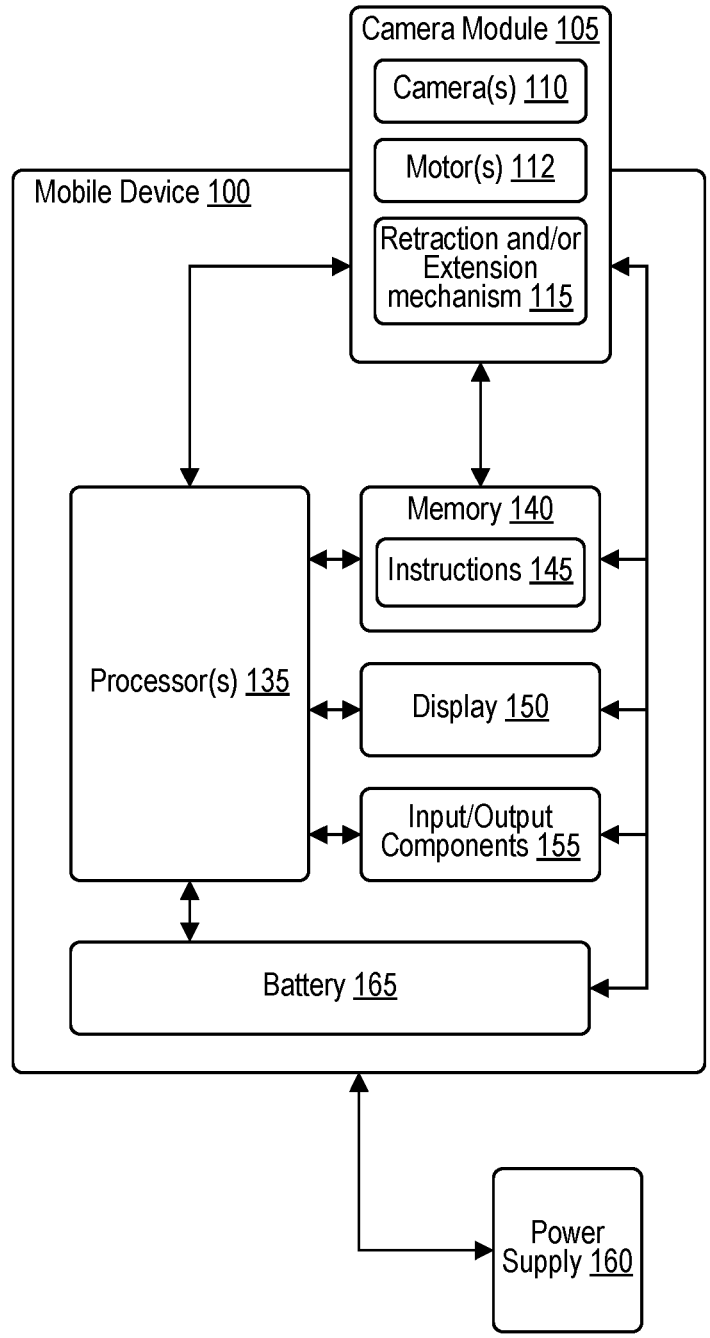
FIG. 1 is an architecture diagram illustrating a mobile device with a camera module.

FIG. 1 is an architecture diagram illustrating a mobile device with a camera module. The mobile device 100 may include a camera module 105, which may include one or more cameras 110. The one or more cameras 110 may be any type of cameras, including a video camera, a still image camera, a visible light camera, a thermographic/infrared camera, a near-infrared (NIR) camera, an ultraviolet camera, a night vision camera, a high-frame-rate (HFR) camera, or some combination thereof. The one or more cameras 110 may each use one or more image sensors of any image sensor type, including a charge-coupled device (CCD) sensor, a complementary metal-oxide semiconductor (CMOS) sensor, a hybrid CCD/CMOS sensor, a quanta image sensor (QIS), or some combination thereof. The one or more image sensors of the one or more cameras 105 may use any type of color filter, including a Bayer filter, a Fujifilm® EXR filter array, a Fujifilm® X-Trans filter, a Quad Bayer filter, a cyan yellow green magenta (CYGM) filter, a red green blue emerald (RGBE) filter, a red yellow yellow blue (RYYB) filter, or some combination thereof. The one or more image sensors of the one or more cameras 105 may include a layered image sensor array such as the Foveon® X3 sensor or a prism-separated set of image sensors as in a three-CCD (3CCD) camera. The one or more cameras 110 may use any type of autofocus, including contrast detection autofocus (CDAF), phase detection autofocus (PDAF), active autofocus, or some combination thereof. The one or more image sensors of the one or more cameras 105 may include one or more focus pixels for PDAF. The one or more cameras 110 may use any type of lens, including a fixed focal length lens, a variable focal length lens, a macro lens, a telephoto lens, a super telephoto lens, a wide angle lens, an ultra-wide angle lens, a fisheye lens, or some combination thereof.

A wide angle lens is a lens with a short focal length (e.g., less than a threshold) and a wide field of view (e.g., wider than a threshold). Using a wide angle lens, a camera can capture much more of the scene than a normal lens can. Wide angle lenses can have fixed (wide prime) and/or variable (wide zoom) focal lengths. The focal length thresholds for wide angle and ultra-wide angle lenses may depend on the dimensions of a film or sensor that is used in the camera. Film or sensors used in cameras are generally rectangular and include a longer side and a shorter side. Lenses that are neither wide angle lenses nor ultra-wide angle lenses generally have focal lengths that are longer, or at least as long as, the longer side of the film or sensor. Wide angle lenses generally have focal lengths that are between the length of the longer side of the film or sensor and the length of the shorter side of the film or sensor, optionally inclusive of one or both of the lengths of the sides of the film or sensor. Ultra-wide angle lenses generally have focal lengths that are the length of the shorter side of the film or sensor or shorter. For example, for a full-frame 35 mm camera with a 36 mm by 24 mm film or sensor, a lens with a focal length of 24 mm or below may be considered ultra-wide angle lens, a lens with a focal length between 24 mm and 35 mm may be considered a wide angle lens, and a lens with a focal length of 35 mm or above may be considered neither a wide angle lens nor an ultra-wide angle lens. A wide angle lens may in some cases cover an angle of view between 64 degrees and 84 degrees, whole an ultra-wide angle lens may cover angles of view beyond 84 degrees, such as 100 degrees, 180 degrees, or beyond. Lenses that are neither wide angle nor ultra-wide angle may cover angles of view below 64 degrees. Wide angle lenses and ultra-wide angle lenses may include curvilinear barrel distortion in which straight lines in the photographed scene appear curved. Wide angle lenses and ultra-wide angle lenses with curvilinear barrel distortion may be referred to as fisheye lenses. Wide angle lenses and ultra-wide angle lenses may be rectilinear lenses, which are designed so that straight lines in the scene will render straight (uncurved) in the photographic image.

The camera module 105 may be capable of retracting into a housing of the mobile device 100 as illustrated in FIGS. 2A, 2B, 3A, 3B, and 11A. Being retracted into the housing of the mobile device 100 may be referred to as the retracted state of the camera module 105. The camera module 105 may be capable of extending from the housing of the mobile device as illustrated in FIGS. 4A, 4B, 6A, 6B, 6C, 6D, 8A, 8B, 8C, 8D, 10A, 10B, 11B. Extending from the housing of the mobile device may be referred to as the extended state of the camera module 105. In some examples, the one or more cameras 110 of the camera module 105 may be configured to capture one or more images while the camera module 105 is in the extended state. As described herein, a plurality of images may be captured by the one or more cameras 110 while the camera module 105 is in the extended state, and the plurality of images can be stitched into a panoramic image.

Figure 11A:
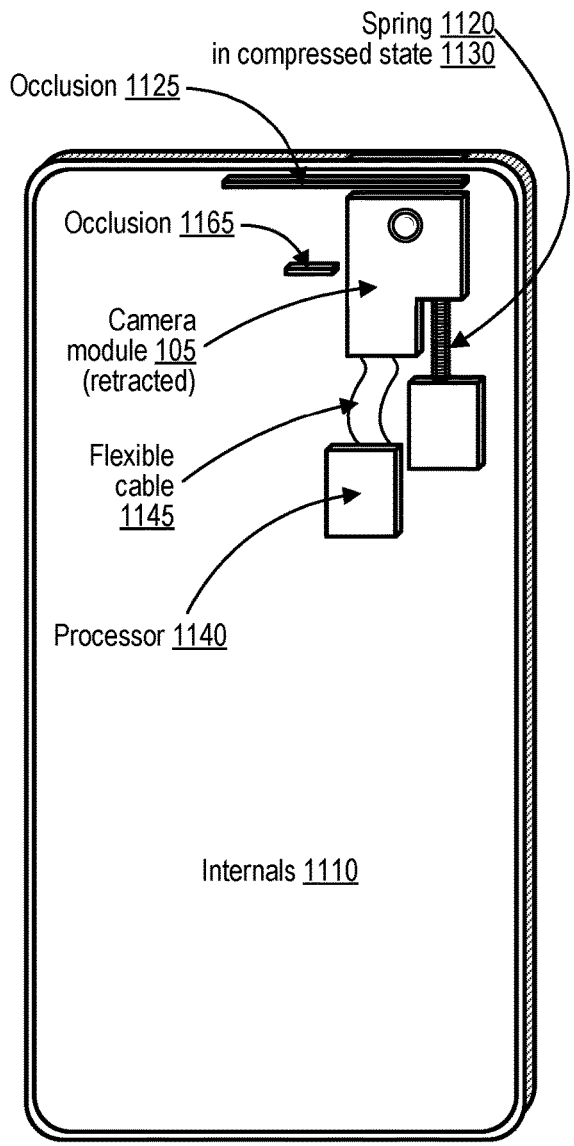
FIG. 11A illustrates an internal view of a mobile device with a camera module in a retracted state.
Figure 11B:
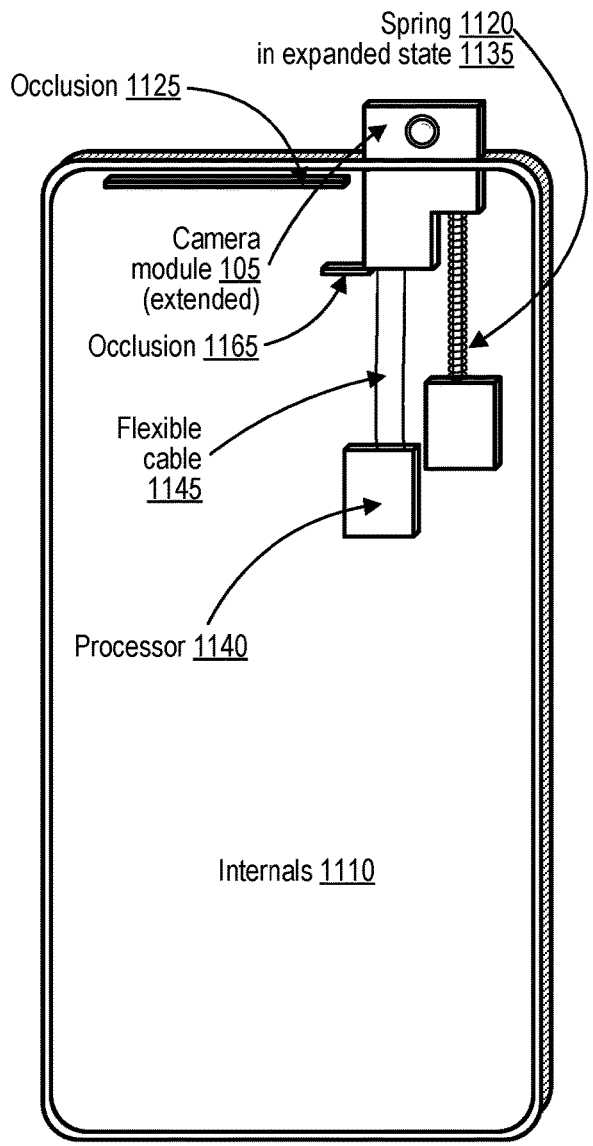
FIG. 11B illustrates an internal view of the mobile device of FIG. 11B with the camera module in an extended state.

The camera module 105 may include a retraction and/or extension mechanism 115 that is configured to move the camera module 105 from the retracted state to the extended state. For example, the retraction and/or extension mechanism 115 may push or pull the camera module 105 from the retracted state to the extended state. The retraction and/or extension mechanism 115 may alternately or additionally push or pull the camera module 105 from the extended state to the retracted state. The retraction and/or extension mechanism 115 may include one or more springs, such as the spring 1120 as illustrated in FIGS. 11A and 11B. The one or more springs may include one or more compression springs and/or one or more tension springs. The retraction and/or extension mechanism 115 may include one or more magnets, which may include permanent magnets, ferromagnets, electromagnets, or some combination thereof. The magnets may be used to attract or repel other magnets or ferromagnetic materials to provide a magnetic pushing or pulling force.

The retraction and/or extension mechanism 115 may include one or more motors 112. The one or more motors 112 may be used to move one or more components of the retraction and/or extension mechanism 115, such as one or more gears or pulleys. The motorized components may, in some cases, directly move the camera module 105 between the retracted state and the extended state. The motorized components may, in some cases, indirectly allow the camera module 105 to move between the retracted state and the extended state, for example by moving an occlusion, such as the occlusion 1125, from a first position to a second position. The occlusion may, in the first position, prevent a pushing or pulling force of a spring or magnet from moving the camera module 105 by occluding the path of the camera module 105. The occlusion may, in the second position, no longer occlude the path of the camera module 105, and therefore allow the pushing or pulling force of the spring or magnet to move the camera module 105. The camera module 105 may include one or more motors 112 that may be used to move portions of the camera module 105 to help point at least one of the one or more cameras 110 in different directions. For example, at least one of the one or more motors 112 may be used to initiate and/or effect the rotation of the camera module 105 that is illustrated in FIGS. 6A, 6B, 6C, 6D, 10A, and 10B. In another example, at least one of the one or more motors 112 may be used to initiate and/or effect the folding or unfolding of the camera module 105 illustrated in FIGS. 8A, 8B, 8C, and 8D.

Figure 16:
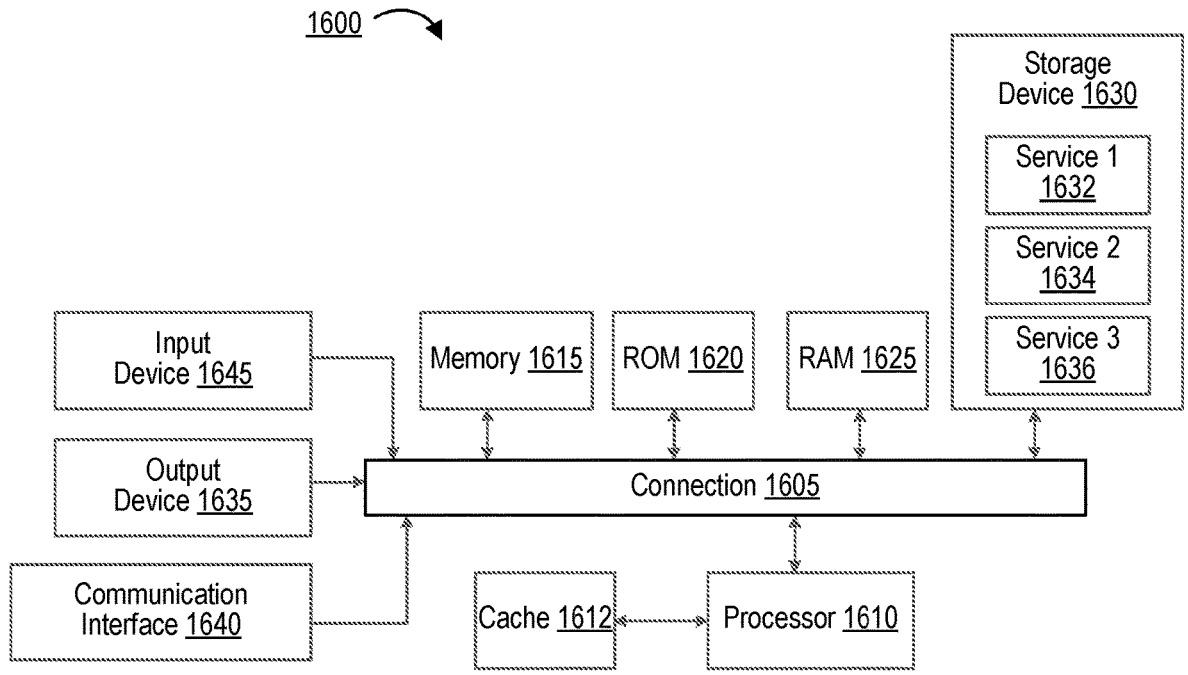
FIG. 16 is a diagram illustrating an example of a system for implementing certain aspects of the present technology.

The mobile device 100 may be a computing system 1600 as illustrated in FIG. 16. The mobile device 100 may include one or more processors 135, each of which may be any type of processor discussed with respect to the processor 1610 of FIG. 16. In some cases, the one or more processors 135 include at least one image signal processor (ISP), at least one digital signal processor (DSP), or some combination thereof. The mobile device 100 may include a memory 140 that includes one or more memory and/or storage media component. Each of the one or more memory and/or storage media components may include any type of memory 1615, ROM, 1620, RAM 1625, cache 1612, storage device 1630, another type of non-transitory computer-readable storage medium, or some combination thereof. The memory 140 may store instructions 145, which may be executed by the one or more processors to perform various operations, including image processing of images from the one or more cameras 110 of the camera module 105, for example to generate a panoramic image.

The mobile device 100 may include one or more displays 150, which may include a liquid crystal display (LCD), a plasma display, an organic light-emitting diode (OLED) display, a low-temperature poly-silicon (LTPO) display, an electronic ink or "e-paper" display, a projector-based display, a holographic display, another suitable display device, or some combination thereof. The display may in some cases output images captured by the one or more cameras 110 of the camera module 105, or may output panoramic images generated by the one or more processors 135 using images captured by the one or more cameras 110 of the camera module 105. The mobile device 100 may include one or more input/output (I/O) components 155, which may include, for example, one or more physical buttons, one or more touch-sensitive screens or other surfaces, any input devices 1645 discussed with respect to FIG. 16, any output devices 1635 discussed with respect to FIG. 16, or some combination thereof. The mobile device 100 may include a battery 165 and may be connected to an external power supply 160, such as a power outlet or an external battery or generator. Power may be provided by the battery 165 and/or by the power supply 160 to the one or more processors 135, the one or more I/O components 155, the one or more displays 150, the memory 140, the one or more cameras 110 of the camera module 105, the one or more retraction and/or extensions mechanisms 115, or some combination thereof. Though not illustrated in FIG. 1, the mobile device 100 may also include a communication interface 1640 or any other components illustrated in and/or discussed with respect to FIG. 16.

Figure 2A:
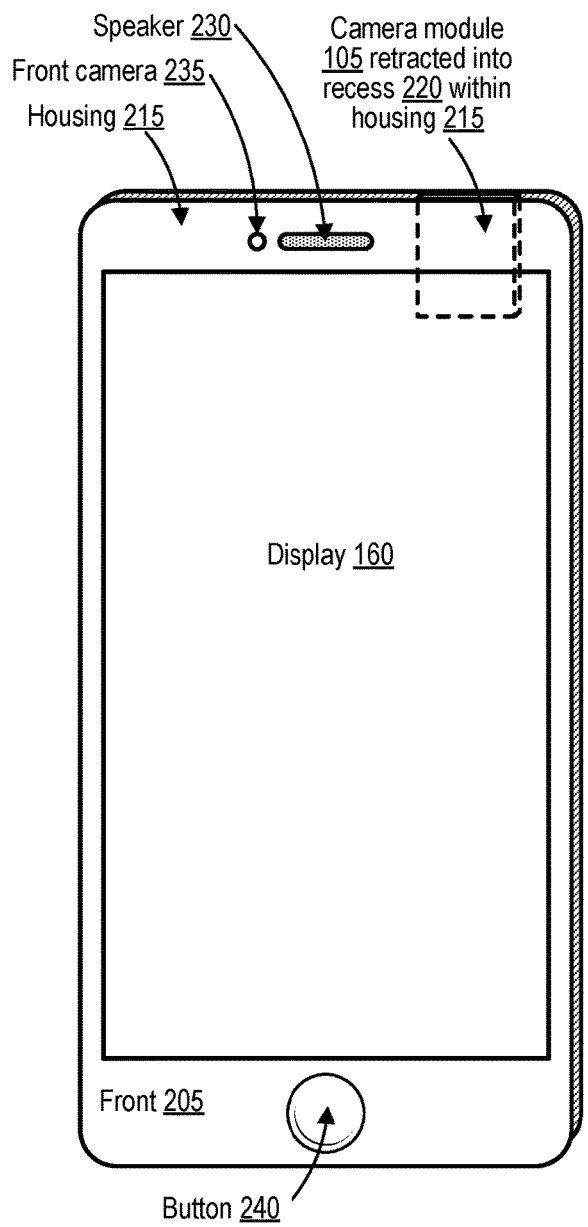
FIG. 2A illustrates a front view of a mobile device with a retracted camera module.

FIG. 2A illustrates a front view of a mobile device with a retracted camera module. In particular, FIG. 2A illustrates a front 205 of an exemplary mobile device 100, with a housing 215, a display 150, a speaker 230, a front-facing camera 235, and a button 240. A camera module 105 is also illustrated retracted into a recess 220 within the housing 215. Because the camera module 105 is retracted into the recess 220, the camera module 105 is not visible in FIG. 2A other than as a set of dashed lines indicating the location of the recess 220 and the camera module 105 within the housing 215. In some cases, a rubber and/or silicone gasket may be present at the edge of the opening of the recess 220 and/or at the edge of the camera module 105 so as to maintain a waterproof or water-resistant seal to avoid damage to the cameras 110 of the camera module 105 and to other internal components of the mobile device 100.

Figure 2B:
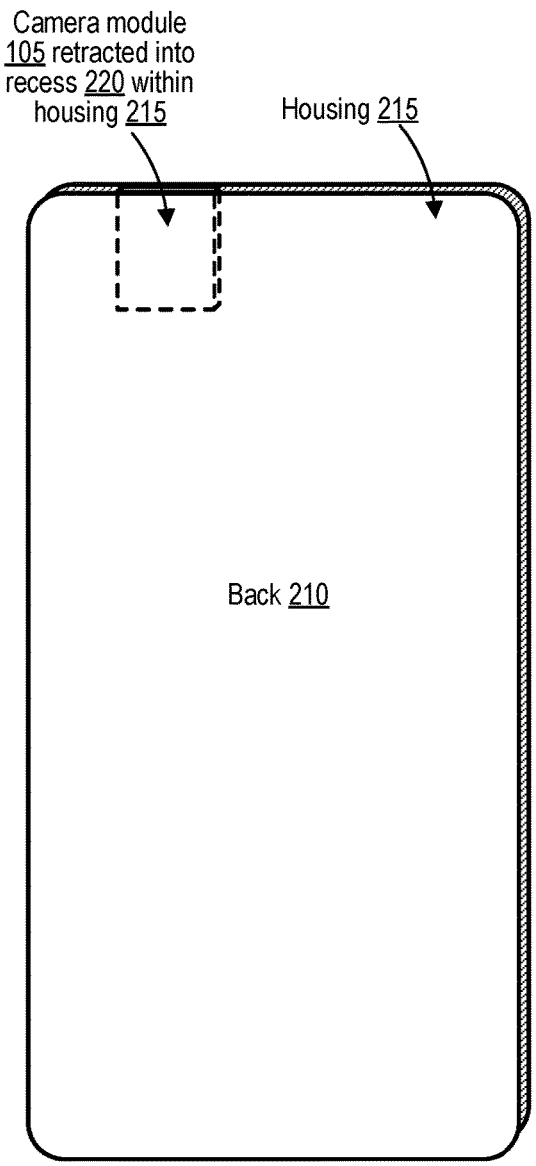
FIG. 2B illustrates a back view of the mobile device of FIG. 2A.

FIG. 2B illustrates a back view of the mobile device of FIG. 2A. The back 210 of the mobile device 100 of FIG. 2A includes the housing 215. Like in FIG. 2A, the camera module 105 is retracted into the recess 220, and therefore the camera module 105 is not visible in FIG. 2B other than as a set of dashed lines indicating the location of the recess 220 and the camera module 105 within the housing 215.

FIG. 3A illustrates a front view of a mobile device with a retracted camera module and a housing with camera cutouts. Like FIG. 2A, the camera module 105 of FIG. 3A is retracted into the recess 220 within the housing 215 of the mobile device 100. However, unlike FIG. 2A, the mobile device 100 of FIG. 3A includes a cutout 310 within the housing 215 at the front 205 of the mobile device 100. The cutout 310 allows a portion of the camera module 105 to be uncovered and accessible even when the camera module 105 is retracted into the recess 220 within the housing 215. In FIG. 3A, the uncovered portion of the camera module 105 includes a camera 330, which may be one of the cameras 110 of the camera module 105. Thus, the cutout 310 enables the camera 330 of the camera module 105 to be uncovered, visible, and functional even while the camera module 105 is retracted into the recess 220 within the housing 215. The camera 330 of camera module 105 may thus function as the main front-facing camera of the mobile device 100, meaning the front-facing camera 235 is no longer necessary and can be removed.

FIG. 3B illustrates a back view of the mobile device of FIG. 3A. Like in FIG. 3A, a cutout 320 in the housing 215 at the back 210 of the mobile device 100 allows a portion of the camera module 105 to be uncovered and accessible even when the camera module 105 is retracted into the recess 220 within the housing 215. In FIG. 3B, the uncovered portion of the camera module 105 includes two cameras 335, which may be two of the cameras 110 of the camera module 105. Thus, the cutout 320 enables the cameras 335 of the camera module 105 to be uncovered, visible, and functional even while the camera module 105 is retracted into the recess 220 within the housing 215. The cameras 335 of camera module 105 may thus function as the main back-facing cameras of the mobile device 100, meaning no separate back-facing or rear-facing camera may be necessary. In some cases, use of two cameras for images can help with focus, as distance to subjects can be more readily discerned from two slightly different vantage points. In some cases, use of two cameras for images can help with lighting, as one camera might use a different exposure or gain setting than the other, and the resulting images can be combined using high-dynamic-range (HDR) imaging.

Figures 4A, 4B:
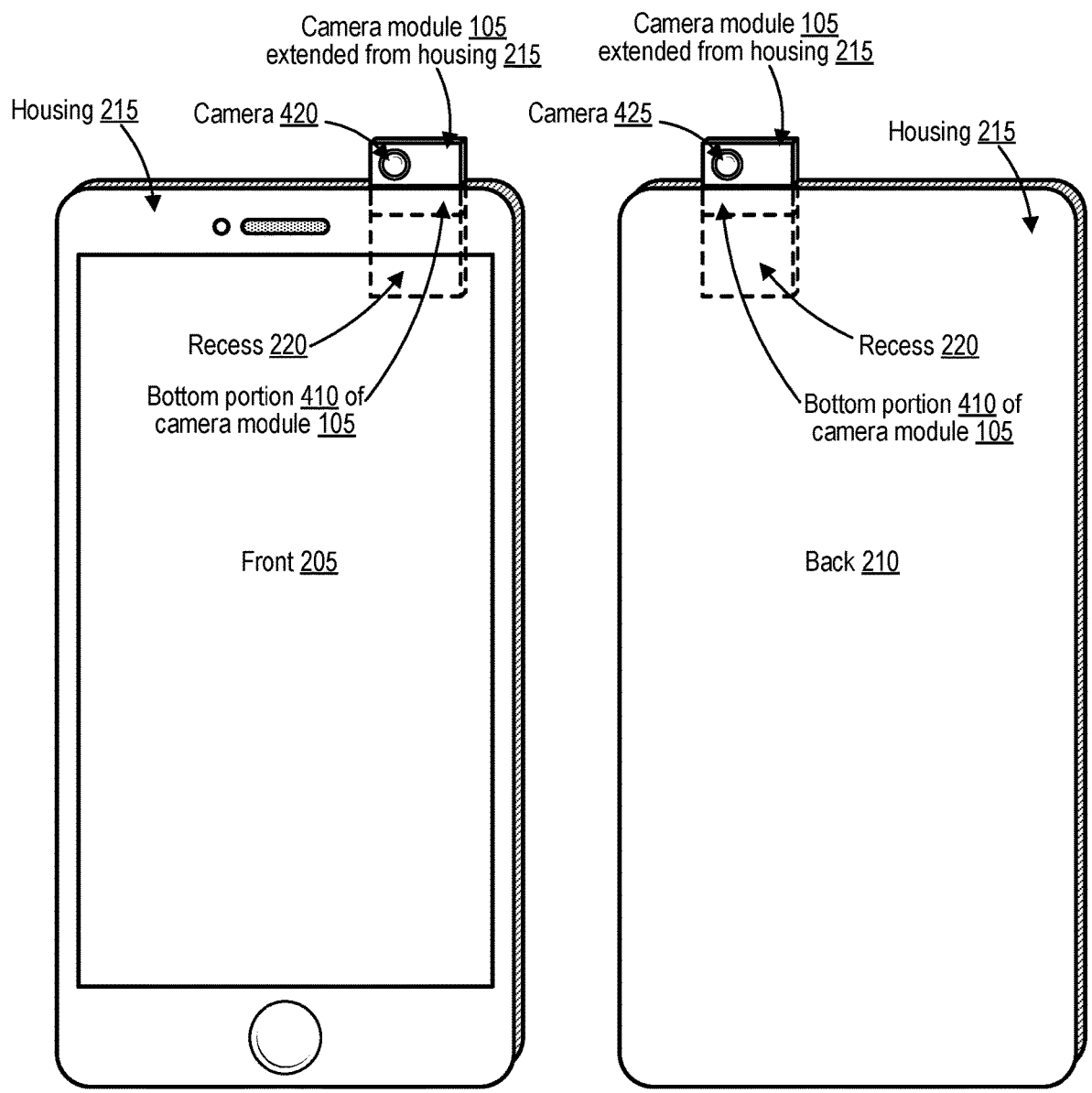
FIG. 4A illustrates a front view of a mobile device with an extended camera module.
FIG. 4B illustrates a back view of the mobile device of FIG. 4A.

FIG. 4A illustrates a front view of a mobile device with an extended camera module. The camera module 105 of FIG. 4A is extended from the housing 215 and includes a camera 420 that is front-facing. The camera 420 may be one of the cameras 110 of the camera module 105. The recess 220 is illustrated using dashed lines below the camera module 105, signifying that the recess 220 is internal to the housing 215. A bottom portion 410 of the camera module 105 is illustrated, using dashed lines, as still within the recess 220. A portion of the camera module 105 may stay within the recess 220 even when the camera module 105 is in the extended state to ensure that the camera module 105 is stable and does not wobble or fall out of the housing 215. The camera 420 may be used for panoramic imaging. The camera 420 may also serve as the main front-facing camera, or one of several main front-facing cameras (e.g., in addition to front-facing camera 235) of the mobile device 100.

Some mobile devices 100 feature a display 150 that covers the entire front 205 of the mobile device 100, or a large majority of the front 205 of the mobile device 100. Such mobile devices 100 often have "notches" or "holes" in the display 150 for a front-facing camera and/or a speaker, such as the front-facing camera 235 and speaker 230 of FIG. 2. Such notches or holes in the display 150 may be necessary because it is not straightforward to stack a camera and a display 150 in a manner that allows both to function through one another. However, if the camera 420 serves as the main front-facing camera, no such notch or hole is necessary, as the camera module 105 can simply move from the retracted state (e.g., as in FIG. 2A) into the extended state (e.g., as in FIG. 4A) whenever a front-facing camera is needed. In some cases, additional components may also be placed in the camera module 105, or in a second retractable module similar to the camera module 105. Such additional components may include, for example, the speaker 230, a microphone, an IR emitter and/or dot projector and/or IR camera/sensor (e.g., for facial recognition), an ambient light sensor, a proximity sensor, a flood illuminator, a light sensor, or some combination thereof.

FIG. 4B illustrates a back view of the mobile device of FIG. 4A. Like the camera module 105 of FIG. 4A, the camera module 105 of FIG. 4B is extended from the housing 215 and includes a camera 425. The camera 425 is back-facing or rear-facing, and may be one of the cameras 110 of the camera module 105. The recess 220 is illustrated using dashed lines below the camera module 105, signifying that the recess 220 is internal to the housing 215. The bottom portion 410 of the camera module 105 is illustrated, using dashed lines, as still within the recess 220. The camera 420 may be used for panoramic imaging. The camera 420 may also serve as the main rear-facing or back-facing camera, or one of several main rear-facing or back-facing cameras of the mobile device 100.

Figure 5A:
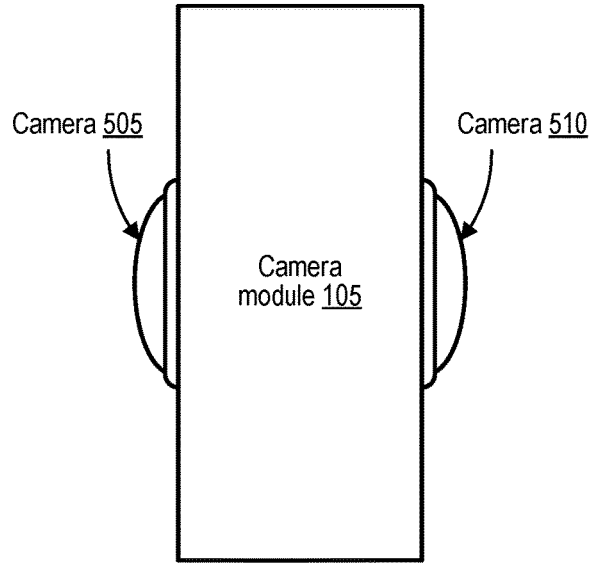
FIG. 5A illustrates top-down view of a camera module with in-line cameras.

FIG. 5A illustrates a top-down view of a camera module with in-line cameras. The camera module 105 of FIG. 5A includes a camera 505 and a camera 510 that are in-line with one another and facing parallel and opposite directions. The camera 505 and the camera 510 may be two of the cameras 110 of the camera module 105. By including cameras 505 and 510 on either side of the camera module 105, the images captured by the cameras 505 and 510 can include image data from all around the camera module 105.

Figure 5B:
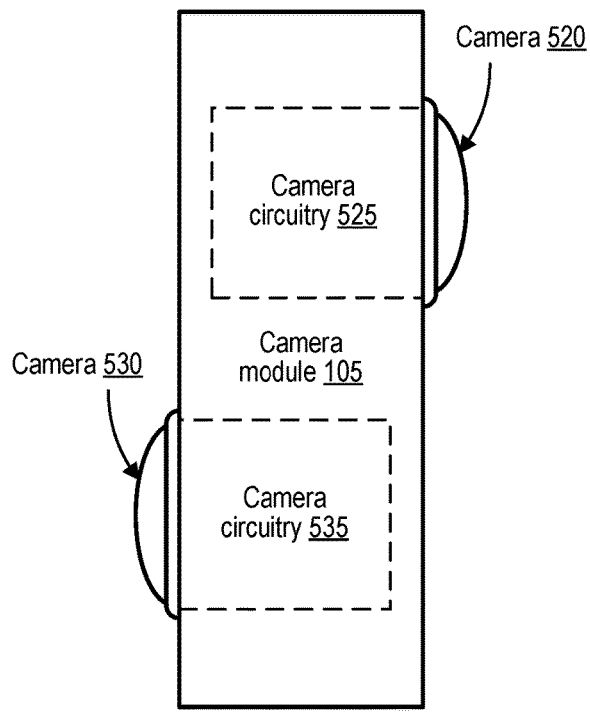
FIG. 5B illustrates top-down view of a camera module with offset cameras.

FIG. 5B illustrates a top-down view of a camera module with offset cameras. The camera module 105 of FIG. 5B includes a camera 520 and a camera 530 that are offset from one another, but that are still facing parallel and opposite directions. The camera 520 and the camera 530 may be two of the cameras 110 of the camera module 105. The camera 520 includes or is connected to camera circuitry 525, while the camera 530 includes or is connected to camera circuitry 535. The camera circuitry 525 and the camera circuitry 535 take up enough space that the camera 520 and the camera 530 could not feasibly be in-line as in the camera module 105 of FIG. 5A. Thus, the camera module 105 design of FIG. 5B is good for larger cameras 520/530, for larger camera circuitry 525/535, and/or for smaller camera modules 105. The camera module 105 of FIG. 4A and FIG. 4B shares its design with the camera module 105 of FIG. 5B.

Figure 6A:
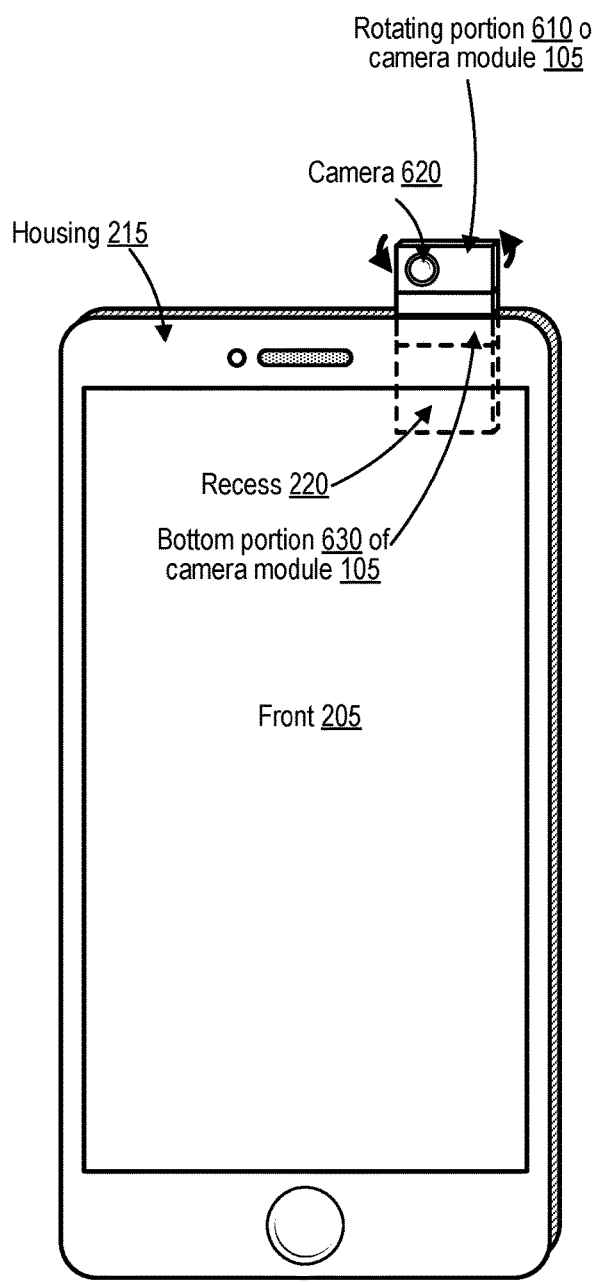
FIG. 6A illustrates a front view of a mobile device with an extended rotating camera module in a first rotational orientation.

FIG. 6A illustrates a front view of a mobile device with an extended rotating camera module in a first rotational orientation. The camera module 105 of FIG. 6A is in the extended state, and is therefore extended from the housing 215. The camera module 105 includes a camera 620, which may be one of the cameras 110 of the camera module 105. The camera module 105 of FIG. 6A includes a bottom portion 630 that is partially within the recess 220. The camera module 105 of FIG. 6A includes a rotating portion 610 that rotates about the bottom portion 630 of the camera module 105 (or relative to the housing 215). The rotating portion 610 is illustrated in a first rotational orientation in FIG. 6A. Rounded arrows illustrated around the rotating portion 610 suggest counter-clockwise rotation of the rotating portion 610 about the bottom portion 630 (i.e., counter-clockwise rotation of the rotating portion 610 relative to the housing 215).

Figure 6B:
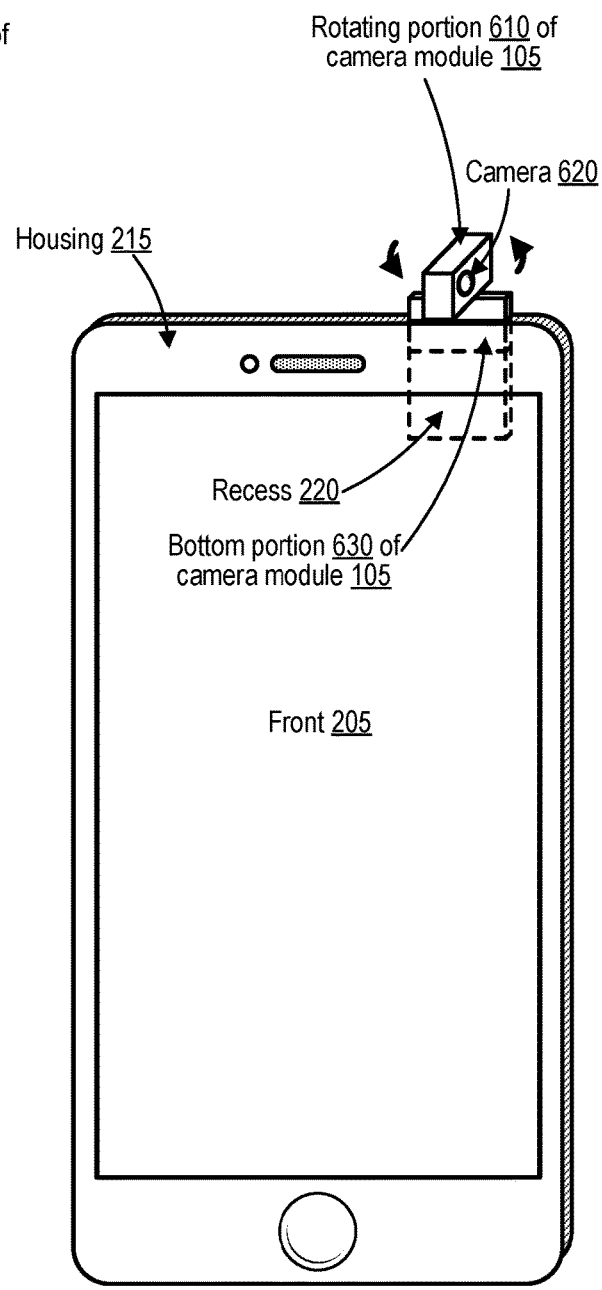
FIG. 6B illustrates a front view of the mobile device of FIG. 6A with the extended rotating camera module in a second rotational orientation.

FIG. 6B illustrates a front view of the mobile device of FIG. 6A with the extended rotating camera module in a second rotational orientation. The rotating portion 610 of the camera module 105 is in a second rotation orientation that is perpendicular to the first rotation orientation illustrated in FIG. 6A. Because the rotation between the first rotation orientation illustrated in FIG. 6A and the second orientation illustrated in FIG. 6B is counter-clockwise, the camera 620 illustrated on the rotating portion 610 of the camera module 105 in FIG. 6B is the same camera 620 as is illustrated on the rotating portion 610 of the camera module 105 in FIG. 6A. In other situations, the rotating portion 610 of the camera module 105 may rotate clockwise about the bottom portion 630 of the camera module 105 (i.e., clockwise rotation of the rotating portion 610 relative to the housing 215).

Figure 6C:
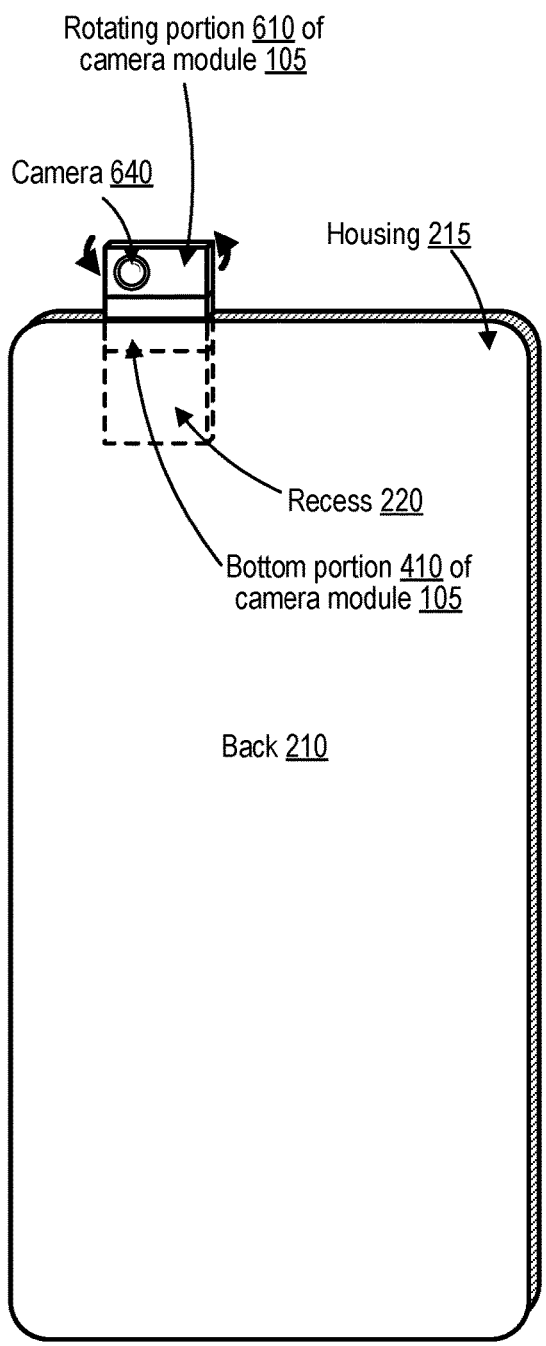
FIG. 6C illustrates a back view of the mobile device of FIG. 6A with the extended rotating camera module in the first rotational orientation.

FIG. 6C illustrates a back view of the mobile device of FIG. 6A with the extended rotating camera module in the first rotational orientation. That is, the mobile device 100 of FIG. 6A is illustrated from the back 210 in FIG. 6C. Because the opposite side of the camera module 105 is shown in FIG. 6C compared to FIG. 6A, the camera 640 illustrated in FIG. 6C is a separate camera than the camera 620 illustrated in FIG. 6A. The camera 640 may be one of the cameras 110 of the camera module 105. The rotating portion 610 of the camera module 105 is again illustrated in the first rotation orientation, and beginning a counter-clockwise rotation about the bottom portion 630 of the camera module 105 (i.e., counter-clockwise rotation of the rotating portion 610 relative to the housing 215).

Figure 6D:
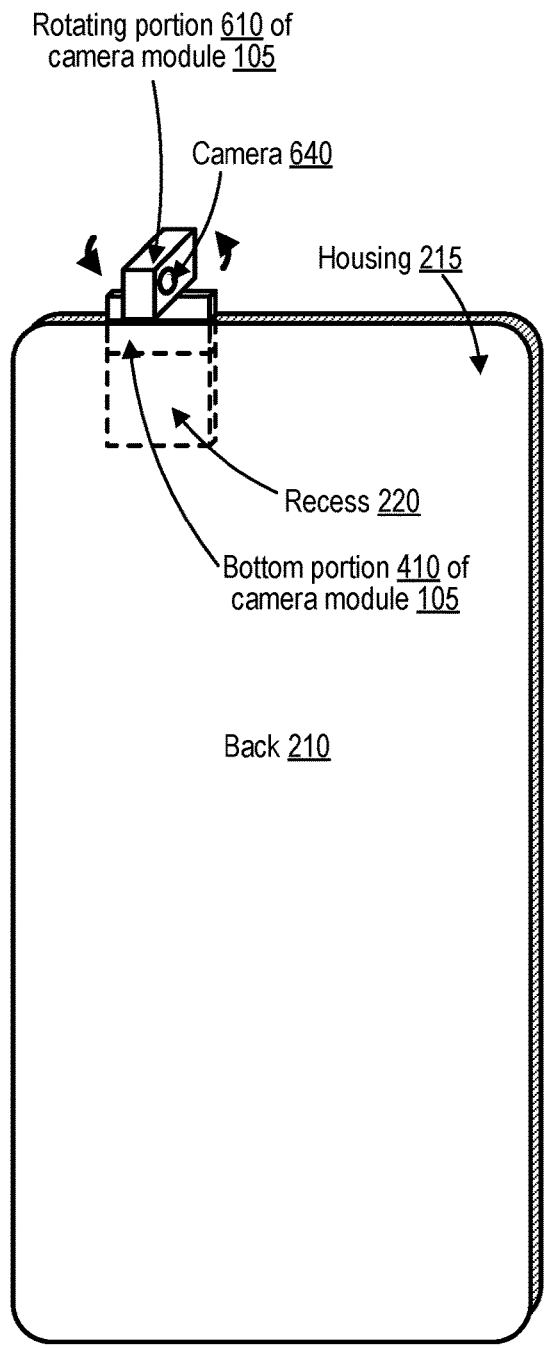
FIG. 6D illustrates a back view of the mobile device of FIG. 6B with the extended rotating camera module in the second rotational orientation.

FIG. 6D illustrates a back view of the mobile device of FIG. 6B with the extended rotating camera module in the second rotational orientation. Because the rotation of the between rotating portion 610 of the camera module 105 is counter-clockwise between FIG. 6C and FIG. 6D, the camera 640 of FIG. 6D is the same camera as the camera 640 of FIG. 6C. In other situations, the rotating portion 610 of the camera module 105 may rotate clockwise about the bottom portion 630 of the camera module 105 (i.e., clockwise rotation of the rotating portion 610 relative to the housing 215).

Figure 7A:
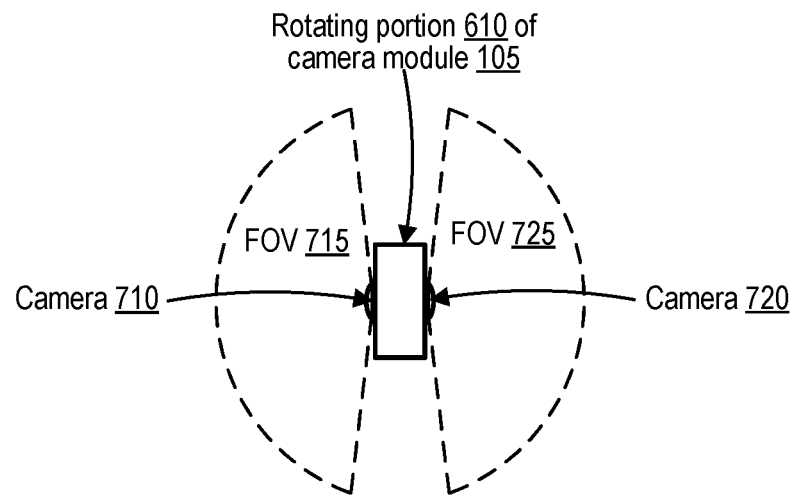
FIG. 7A illustrates top-down view of a rotating camera module in a first rotational orientation, along with a corresponding field of view.

FIG. 7A illustrates a top-down view of a rotating camera module in a first rotational orientation, along with a corresponding field of view. The rotating portion 610 of the camera module 105 of FIG. 7A includes a first camera 710 and a second camera 720 in-line with one another, similar to the camera module 105 of FIG. 5A. The cameras 710 and 720 may be two of the cameras 110 of the camera module 105. In FIG. 7A, the rotating portion 610 of the camera module 105 is in a first rotational orientation. A first field of view (FOV) 715 is illustrated as the field of view of the first camera 710 while the rotating portion 610 of the camera module 105 is in the first rotational orientation of FIG. 7A. A second field of view (FOV) 725 is illustrated as the field of view of the second camera 720 while the camera module 105 is in the first rotational orientation of FIG. 7A. The FOV 715 and FOV 725 together cover a left area and a right area, respectively, but are missing a top area and a bottom area.

Figure 7B:
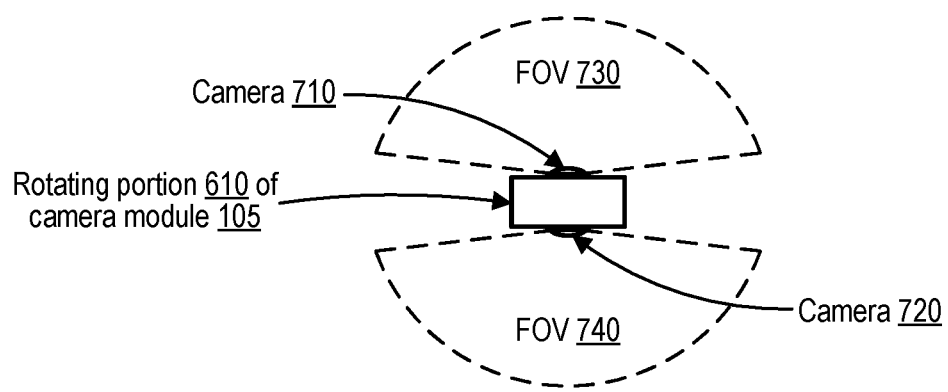
FIG. 7B illustrates top-down view of the rotating camera module of FIG. 7A in a second rotational orientation, along with a corresponding field of view.

FIG. 7B illustrates a top-down view of the rotating camera module of FIG. 7A in a second rotational orientation, along with a corresponding field of view. The rotating portion 610 of the camera module 105 of FIG. 7B includes the first camera 710 and the second camera 720 as in FIG. 7A. In FIG. 7B, the rotating portion 610 of the camera module 105 is in a second rotational orientation. A first field of view (FOV) 730 is illustrated as the field of view of the first camera 710 while the rotating portion 610 of the camera module 105 is in the second rotational orientation of FIG. 7B. A second field of view (FOV) 740 is illustrated as the field of view of the second camera 720 while the camera module 105 is in the second rotational orientation of FIG. 7B. The FOV 730 and FOV 740 together cover a top area and a bottom area, respectively, but are missing a left area and a right area. The rotation of the rotating portion 610 of the camera module 105 between the first rotational orientation of FIG. 7A and the second rotational orientation of FIG. 7B is clockwise.

Figure 7C:
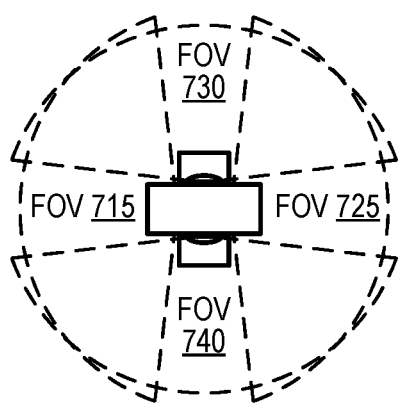
FIG. 7C illustrates FIG. 7A and FIG. 7B overlaid on top of one another.

FIG. 7C illustrates FIG. 7A and FIG. 7B overlaid on top of one another. By capturing images using the first camera 710 and second camera 720 while the rotating portion 610 of the camera module 105 is in the first rotational orientation of FIG. 7A, the cameras 710 and 720 capture images of the first FOV 715 and the second FOV 725. By capturing images using the first camera 710 and second camera 720 while the rotating portion 610 of the camera module 105 is in the second rotational orientation of FIG. 7B, the cameras 710 and 720 capture images of the first FOV 730 and the second FOV 740. By rotating the rotating portion 610 of the camera module 105, then, the cameras 710 and 720 are able to capture images all around the camera module 105 (e.g., 360 degrees around the camera module 105, with no gaps). Stitched together, these images can then create a 360 degree image, such as a 360 degree panoramic image.

Figure 8A:
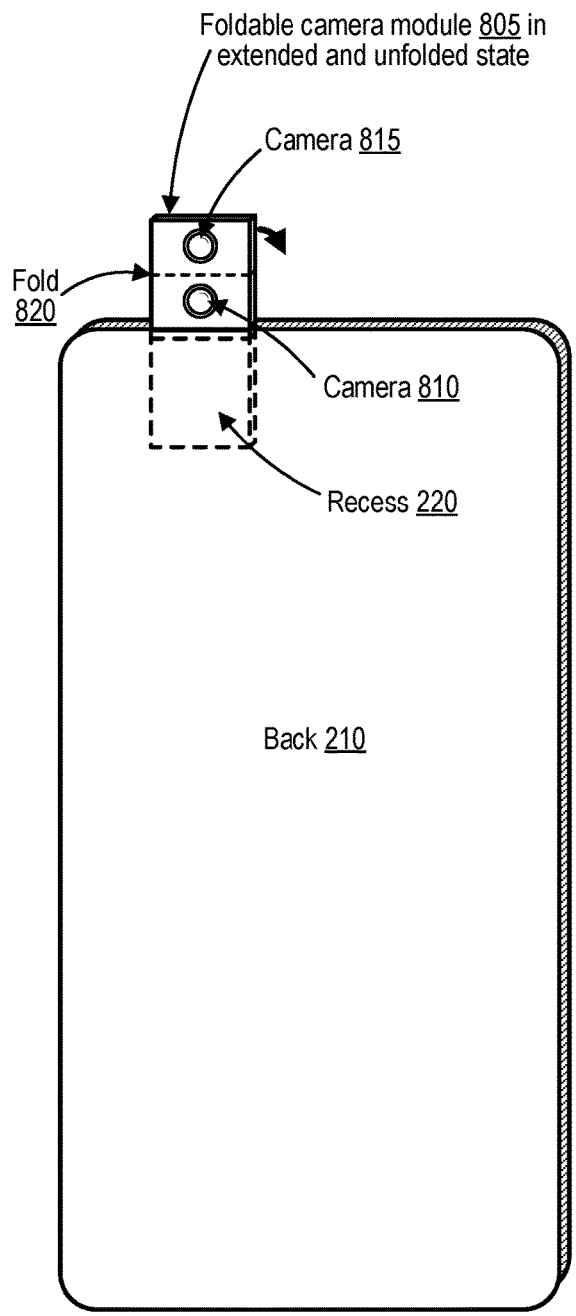
FIG. 8A illustrates a back view of a mobile device with an extended folding camera module in an unfolded state.

FIG. 8A illustrates a back view of a mobile device with an extended folding camera module in an unfolded state. In particular, the mobile device 100 of FIG. 8A includes a foldable camera module 805 that is in an extended state, and that is in an unfolded state. The foldable camera module 805 is a type of camera module 105. The foldable camera module 805 of FIG. 8A, like the camera module 105 of FIG. 3B, includes two cameras and a fold. The two cameras 810 and 815 of the foldable camera module 805 of FIG. 8A may be two of the cameras 110 of the camera module 105. The fold 820 of FIG. 8A is illustrated as a dashed line and represents a line along which a first portion of the foldable camera module 805 (that has camera 815) can fold about the fold 820 relative to a second portion of the foldable camera module 805 (that has camera 810). An arrow indicates the direction of folding.

Figure 8B:
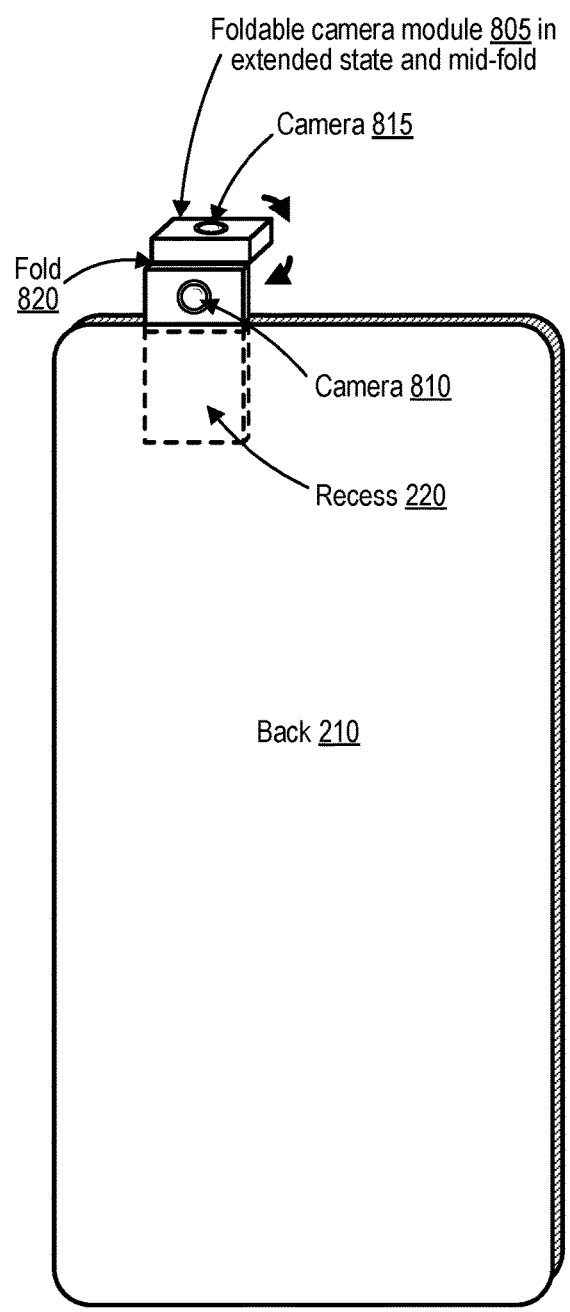
FIG. 8B illustrates a back view of the mobile device of FIG. 8A with the extended folding camera module in a folding state.

FIG. 8B illustrates a back view of the mobile device of FIG. 8A with the extended folding camera module in a folding state. That is, the foldable camera module 805 of FIG. 8A is illustrated again in FIG. 8B, but this time in the midst of folding. Arrows indicate the direction of folding. The first portion of the foldable camera module 805 (that has camera 815) is shown folding about the fold 820 and positioned perpendicular to the second portion of the foldable camera module 805 (that has camera 810).

Figure 8C:
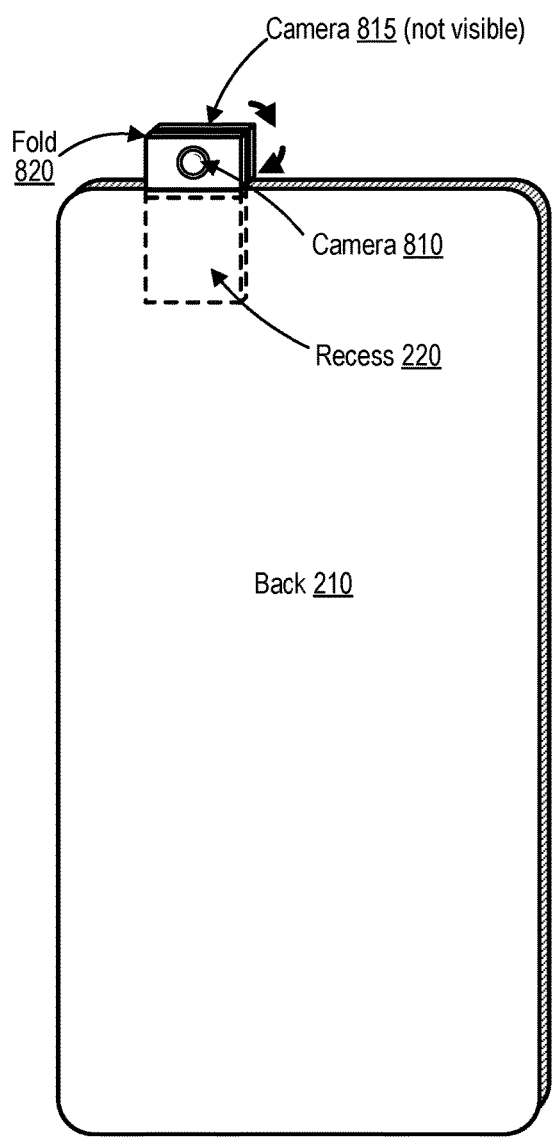
FIG. 8C illustrates a back view of the mobile device of FIG. 8A with the extended folding camera module in a folded state.

FIG. 8C illustrates a back view of the mobile device of FIG. 8A with the extended folding camera module in a folded state. That is, the foldable camera module 805 of FIGS. 8A and 8B is illustrated again in FIG. 8C, but this time after folding is complete. Arrows indicate the direction of folding. The first portion of the foldable camera module 805 (that has camera 815) is shown having folded over about the fold 820 and positioned parallel to the second portion of the foldable camera module 805 (that has camera 810). The camera 815 is thus no longer visible as it is facing the front 205, but is pointed in a direction parallel to and opposite the direction that the camera 810 is pointed.

Figure 8D:
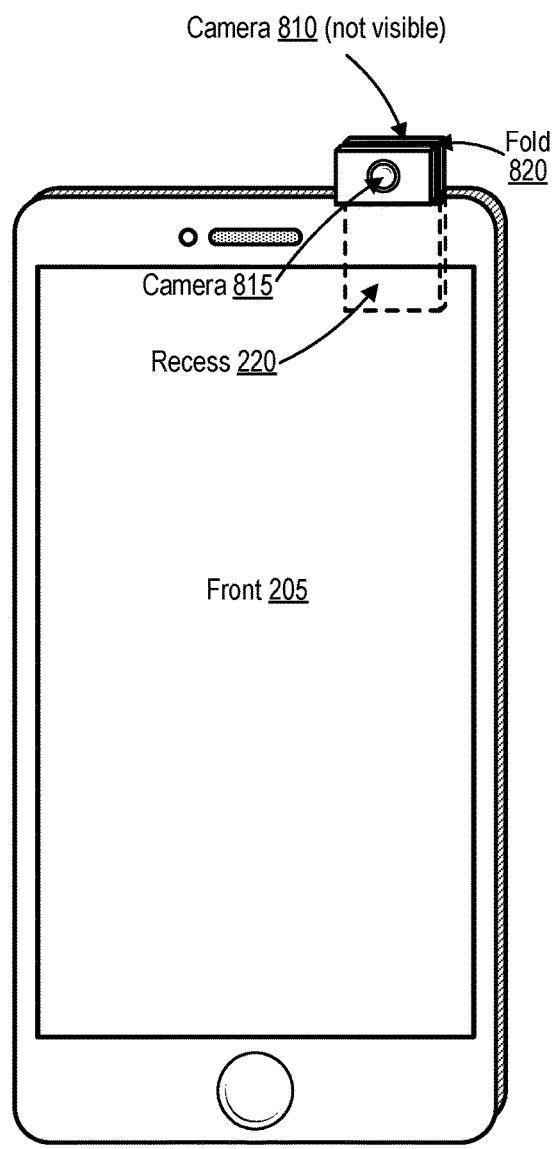
FIG. 8D illustrates a front view of the mobile device of FIG. 8A with the extended folding camera module in the folded state.

FIG. 8D illustrates a front view of the mobile device of FIG. 8C with the extended folding camera module in the folded state. That is, the front 205 side of the mobile device 100 of FIG. 8C is illustrated. As such, the camera 815 that faces the front 205 is visible, but the camera 810 that faces the back 210 is not visible.

Figure 9:
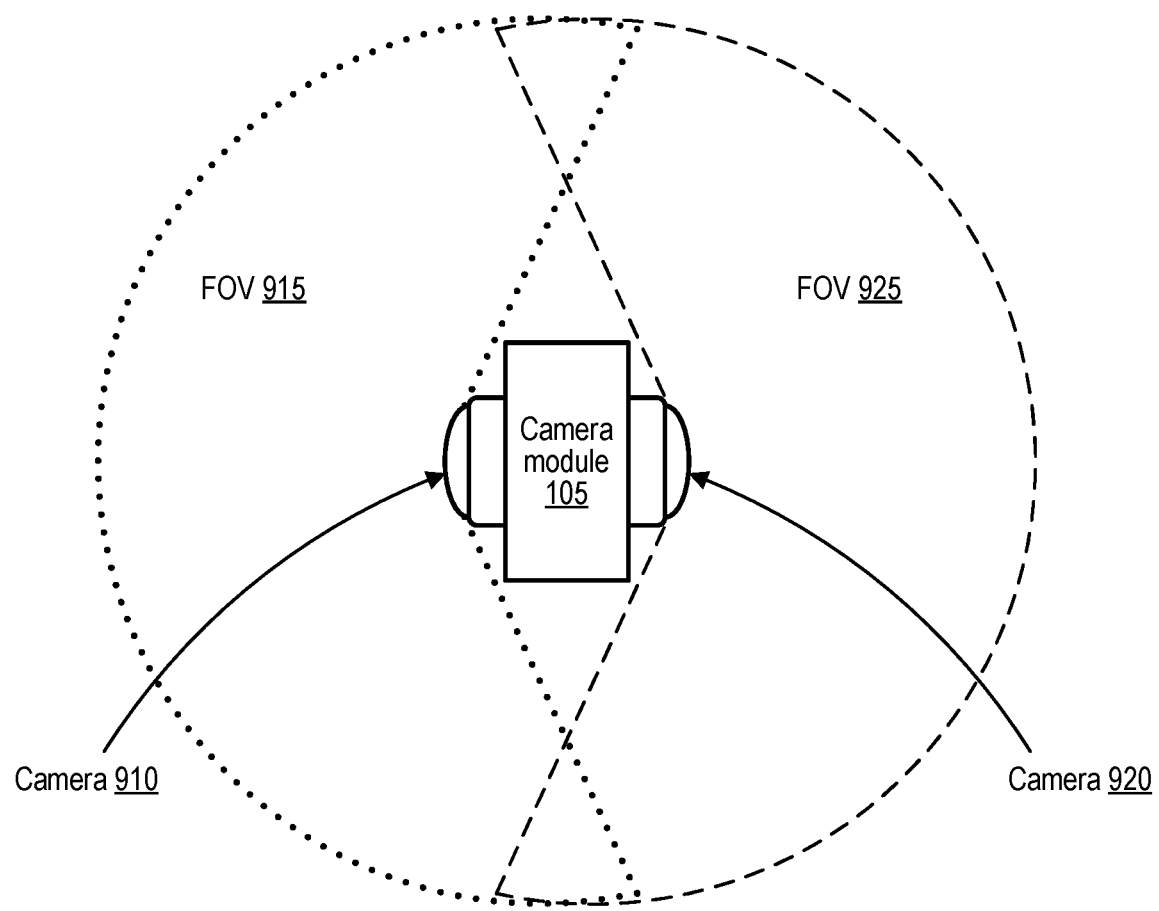
FIG. 9 illustrates top-down view of a camera module with ultra wide angle lenses, along with a corresponding field of view.

FIG. 9 illustrates a top-down view of a camera module with ultra wide angle lenses, along with a corresponding field of view. The camera module 105 of FIG. 9 includes two cameras 910 and 920, both with ultra wide angle lenses, or fisheye lenses. The two cameras 910 and 920 may be two of the cameras 110 of the camera module 105. The first camera 910 has a first field of view (FOV) 915 indicated with dotted lines, that covers the left side but also some of the top and bottom side. The second camera 920 has a second field of view (FOV) 925 indicated with dashed lines, that covers the right side but also some of the top and bottom side. By capturing images using the first camera 910 and second camera 920 in just a single orientation, without any rotation of the camera module 105, the cameras 910 and 920 capture images of the first FOV 915 and the second FOV 925 that, put together, comprise a complete field of view around the camera module 105, with no gaps. Thus, cameras 910 and 920 are able to capture images all around the camera module 105 (e.g., 360 degrees around the camera module 105, with no gaps). Stitched together, these images can then create a 360 degree image, such as a 360 degree panoramic image. Camera modules 105 that do not rely on rotation, such as the camera modules 105 of FIGS. 4A, 4B, 8A, 8B, 8C, and 8D, can use ultra wide angle lenses to achieve this. In some cases, the FOVs 915 and 925 may be achievable with wide angle lenses rather than ultra wide angle lenses. In some cases (not illustrated), gaps may exist between the fields of view 915 and 925, in which case those gaps may be filled in automatically through pixel interpolation based on one or more pixels that neighbor the gap within one of or both of the fields of view 915 and 925.

Figures 10A, 10B:
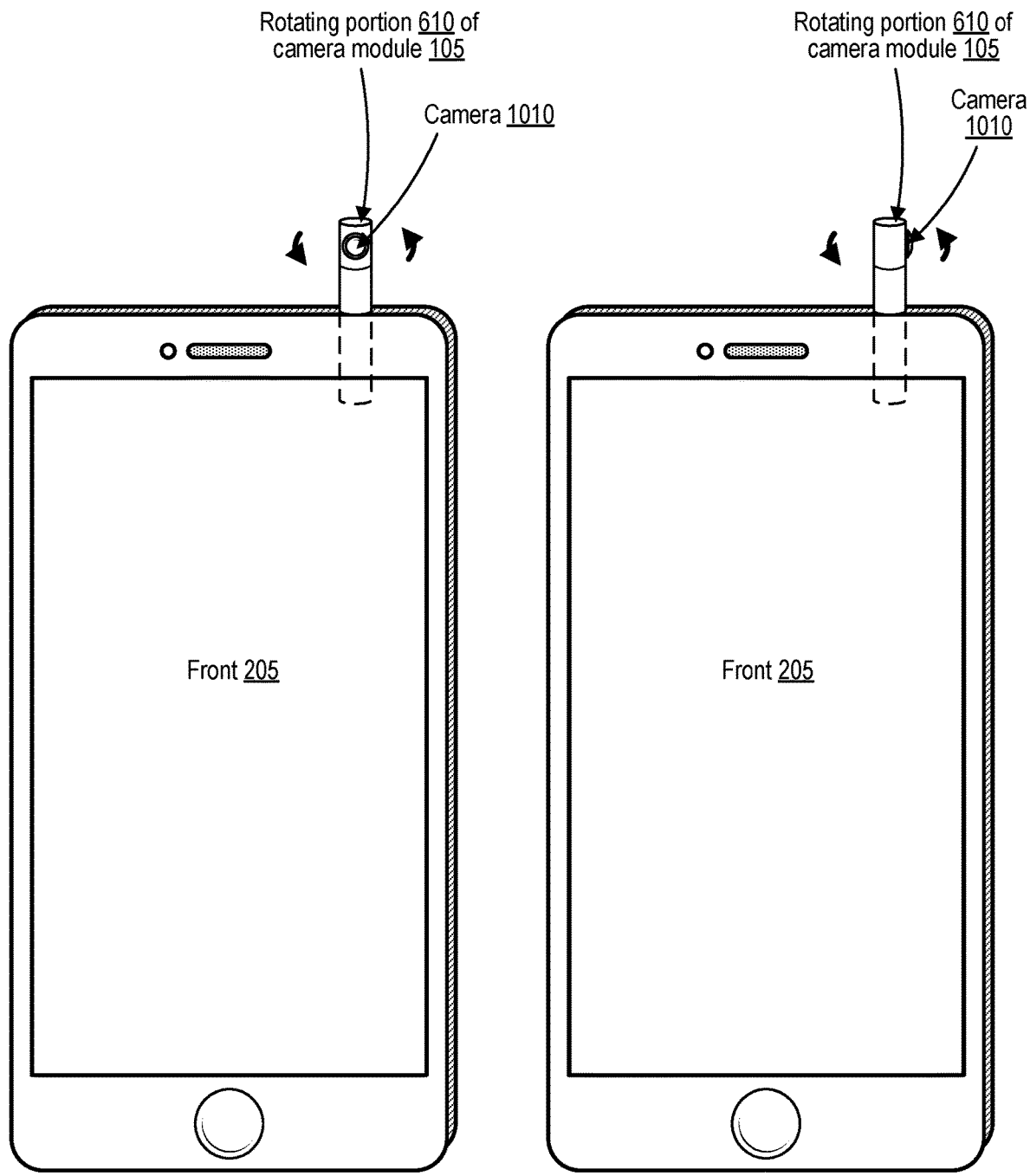
FIG. 10A illustrates a front view of a mobile device with an extended cylindrical rotating camera module in a first rotational orientation.
FIG. 10B illustrates a front view of the mobile device of FIG. 10A with the extended cylindrical rotating camera module in a second rotational orientation.

FIG. 10A illustrates a front view of a mobile device with an extended cylindrical rotating camera module in a first rotational orientation. The mobile device 100 and camera module 105 of FIG. 10A are similar to the mobile device 100 and camera module 105 of FIG. 6A, except that the camera module 105 is cylindrical rather than rectangular. In some cases, the rotating portion 610 of the camera module 105 may be more easily rotated, or its rotation more stable, when the camera module 105 is cylindrical as in FIG. 10A than when the camera module 105 is rectangular as in FIG. 6A. The rotating portion 610 of the camera module 105 of FIG. 10A includes a camera 1010, which may be one of the cameras 110 of the camera module 105.

FIG. 10B illustrates a front view of the mobile device of FIG. 10A with the extended cylindrical rotating camera module in a second rotational orientation. The rotating portion 610 of the camera module 105 of FIG. 10A is rotated counter-clockwise from the first rotational orientation of FIG. 10A to the second rotational orientation of FIG. 10B as indicated by the arrows. Due to this rotation, the camera 1010 is now visible facing the right side, rather than the front 205. While the camera module 105 of FIGS. 6A-6D includes cameras 620 and 640 on both sides, the camera module 105 of FIGS. 10A-10B only includes a single camera 1010 on the rotating portion 610. Because the camera 1010 will be rotated, eventually it will capture images whose field of view can add up to the entire surroundings of the camera module 105. In reference to FIG. 7C, through rotation the single camera 1010 will eventually be able to capture images at each of the fields of view 715, 725, 730, and 740. Thus, while slightly slower, the single camera 1010 will still be able to generate a 360 degree image, such as a 360 degree panoramic image.

FIG. 11A illustrates an internal view of a mobile device with a camera module in a retracted state. The view of the internals 1110 of the mobile device 100 is focused on the camera module 105 and the retraction and/or extension mechanism 115, and thus other components of the mobile device 100 are not illustrated. The camera module 105 is illustrated as retracted in FIG. 11A. The camera module 105 is connected to a processor 1140 (which may be one of the one or more processors 135 of the mobile device 100) via a flexible cable such as a ribbon cable, a flexible printed circuit (FPC), or another type of flexible cable. The flexible cable 1145 has some slack while the camera module 105 is retracted as in FIG. 11A.

A spring 1120 is illustrated in a compressed state 1130 in FIG. 11A. The spring may be a compression spring that wants to expand from its compressed state 1130 to its expanded state 1135, and thereby wants to push the camera module 105 out to move from the retracted state into the extended state. While the occlusion 1125 is in the first position that it is in FIG. 11A, the occlusion 1125 blocks the spring 1120 from expanding and thus from pushing the camera module 105 out to move from the retracted state into the extended state. The occlusion 1125 can be moved manually or via actuation of a motor from the first position as in FIG. 11A into a second position as in FIG. 11B in which the occlusion 1125 no longer occludes the spring 1120 from expanding and thus from pushing the camera module 105 out to move from the retracted state into the extended state. Movement of the occlusion 1125 from the first position as in FIG. 11A to the second position as in FIG. 11B then allows the spring to expand and push the camera module 105 out to move from the retracted state into the extended state.

FIG. 11B illustrates an internal view of the mobile device of FIG. 11B with the camera module in an extended state. The camera module 105 is illustrated as extended in FIG. 11B. The flexible cable 1145 is taut while the camera module 105 is extended as in FIG. 11B. The spring 1120 is illustrated in an extended state 1135 in FIG. 11B. As discussed earlier, the spring may be a compression spring, in which case the extended state 1135 represents its relaxed state in which it has successfully pushed the camera module 105 from the retracted state into the extended state.

The spring 1120 may alternately be a torsion spring that wants to compress from its expanded state 1135 to its compressed state 1130, and thereby wants to pull the camera module 105 in to move from the extended state into the retracted state. While the occlusion 1165 is in the first position that it is in FIG. 11B, the occlusion 1165 blocks the spring 1120 from compressing and thus from pulling the camera module 105 in to move from the extended state into the retracted state. The occlusion 1165 can be moved manually or via actuation of a motor from the first position as in FIG. 11B into a second position as in FIG. 11A in which the occlusion 1165 no longer occludes the spring 1120 from compressing and thus from pulling the camera module 105 in to move from the extended state into the retracted state. Movement of the occlusion 1165 from the first position as in FIG. 11B to the second position as in FIG. 11A then allows the spring to compress and pull the camera module 105 out to move from the extended state into the retracted state.

Figure 12:
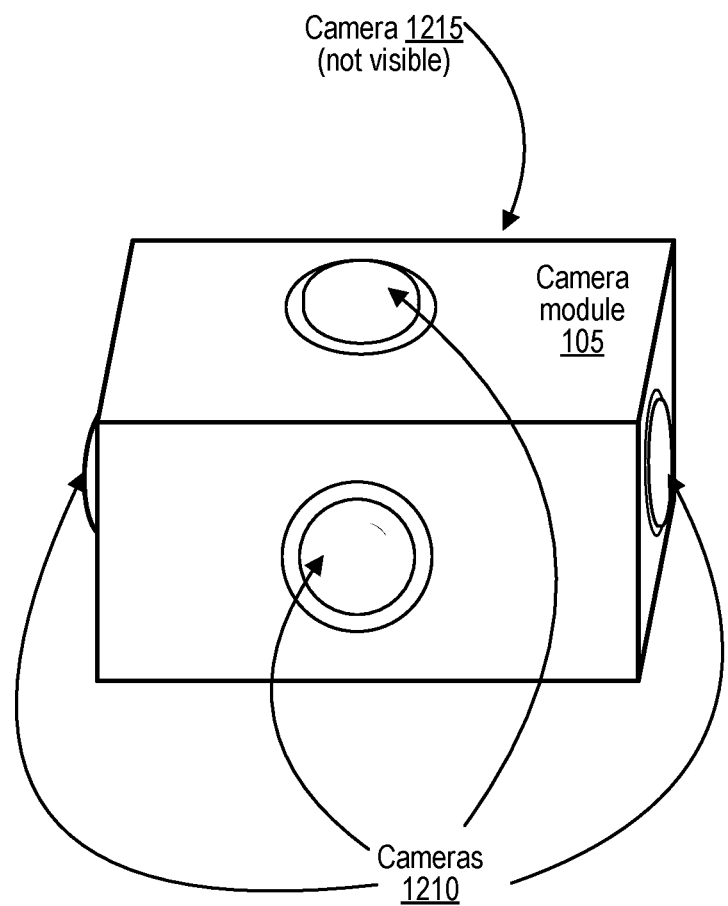
FIG. 12 illustrates a polyhedral camera module with cameras on multiple sides.

FIG. 12 illustrates a polyhedral camera module with cameras on multiple sides. The camera module 105 of FIG. 12 includes four visible cameras 1210. A fifth camera 1215 on the rear side that is not visible may also be present. A camera module 105 with cameras on multiple sides, such as the camera module 105 of FIG. 12, may be used as a way to acquire additional images from different fields of view without need for rotation as in FIGS. 6A, 6B, 6C, 6D, 10A, and 10B, or folding as in FIGS. 8A, 8B, 8C, and 8D. Some camera modules 105 may use a combination of techniques, such as multiple cameras on different sides, rotation, folding, or some combination thereof.

Figure 13:
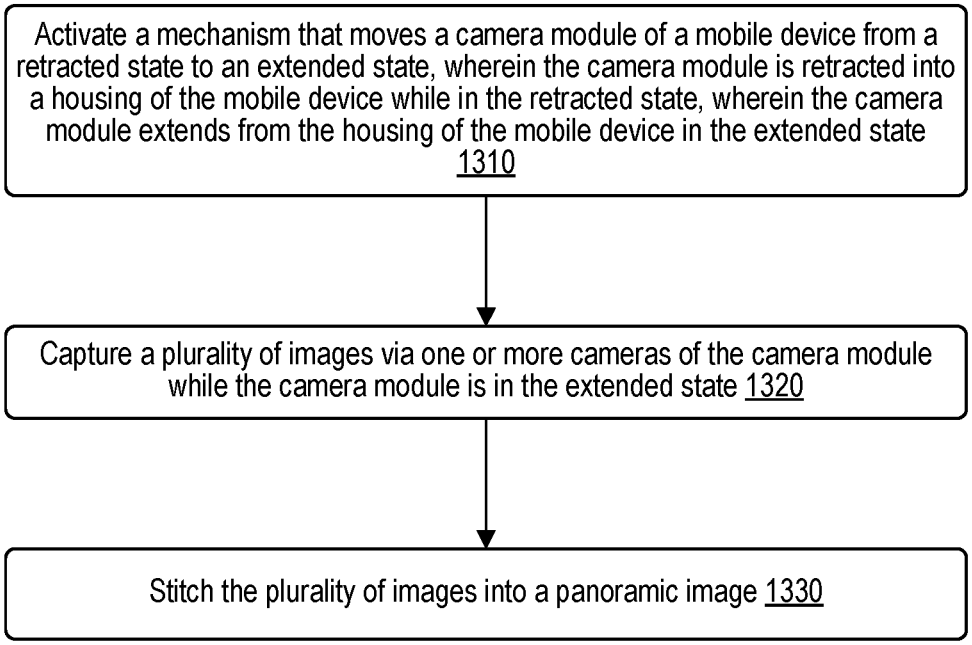
FIG. 13 is a flow diagram illustrating a method of image processing.

FIG. 13 is a flow diagram illustrating a method of image processing. At step 1310, the mobile device 100 activates a mechanism 115 that moves a camera module 105 of the mobile device 100 from a retracted state to an extended state. The camera module 105 is retracted into a housing 215 of the mobile device 100 while in the retracted state. The camera module 105 extends from the housing 215 of the mobile device 100 in the extended state. Step 1310 of FIG. 13 may be similar or equivalent to step 1410 of FIG. 14.

At step 1320, the mobile device 100 captures a plurality of images using one or more cameras 110 of the camera module 105 while the camera module 105 is in the extended state. Step 1320 of FIG. 13 may be similar or equivalent to step 1425 of FIG. 14. At step 1330, the mobile device 100 stitches the plurality of images into a panoramic image. Step 1330 of FIG. 13 may be similar or equivalent to step 1430 of FIG. 14.

Figure 14:
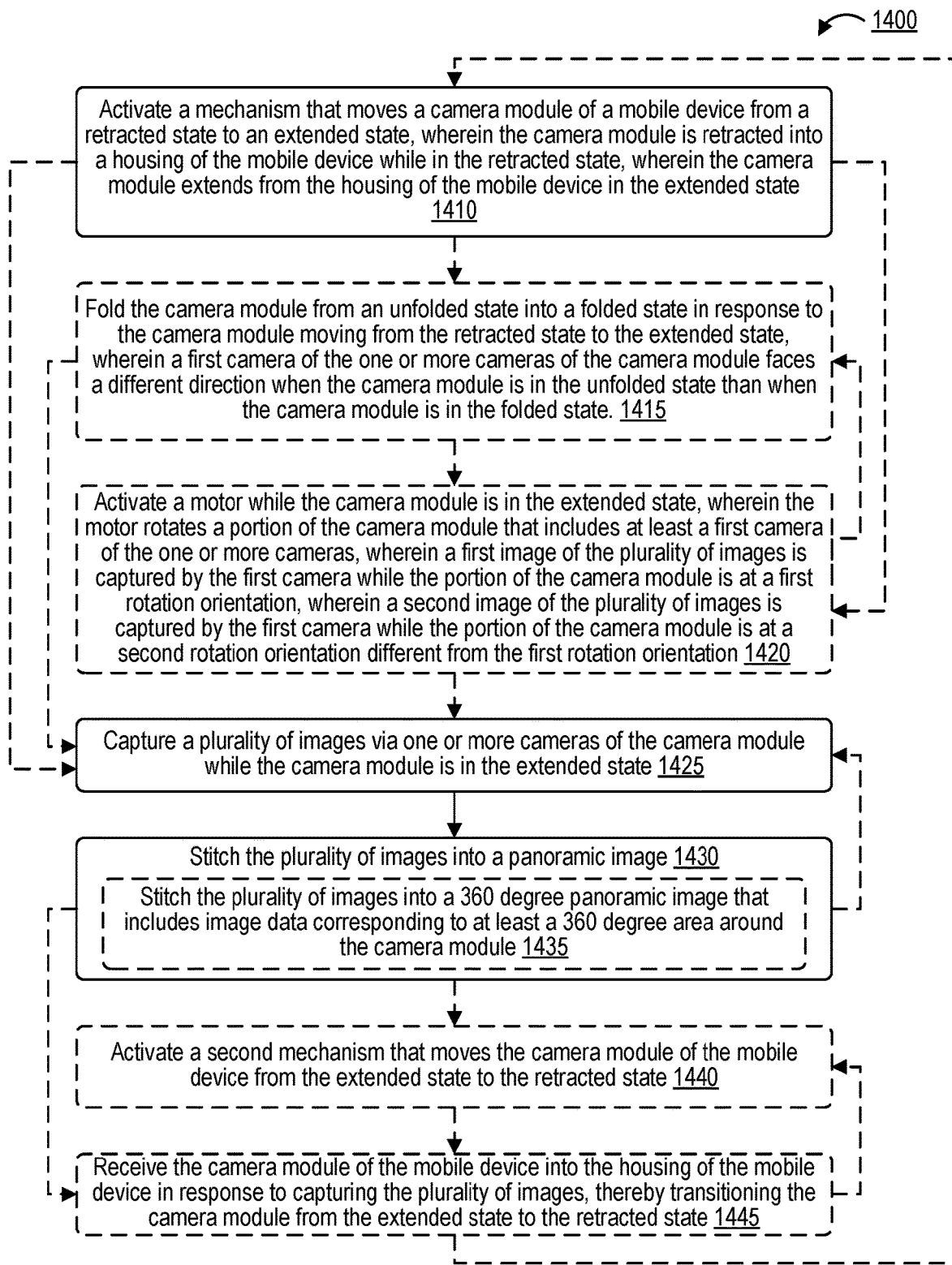
FIG. 14 is a flow diagram illustrating a method of operating a retractable camera module and panoramic image processing.

FIG. 14 is a flow diagram illustrating a method of operating a retractable camera module and panoramic image processing. At step 1410, the mobile device 100 activates a mechanism 115 that moves a camera module 105 of the mobile device 100 from a retracted state to an extended state. The camera module 105 is retracted into a recess 220 in the housing 215 of the mobile device 100 while in the retracted state. The camera module 105 extends from the housing 215 of the mobile device 100 in the extended state. Step 1410 may be followed by any of steps 1415, 1420, or 1425.

At optional step 1415, the mobile device 100 folds the camera module 105 from an unfolded state (as in FIG. 8A) into a folded state (as in FIGS. 8C and 8D) in response to (or otherwise after) the camera module 105 moving from the retracted state to the extended state. A first camera of the one or more cameras 110 of the camera module 105 faces a different direction when the camera module 105 is in the unfolded state than when the camera module 105 is in the folded state. Step 1415 may be followed by step 1420 or 1425.

At optional step 1420, the mobile device 100 activates a motor while the camera module 105 is in the extended state. The motor rotates a portion 610 of the camera module 105 that includes at least a first camera of the one or more cameras 110. A first image of the plurality of images (that are captured in step 1425) is captured by the first camera while the portion 610 of the camera module 105 is at a first rotation orientation. A second image of the plurality of images (that are captured in step 1425) is captured by the first camera while the portion 610 of the camera module 105 is at a second rotation orientation different from the first rotation orientation 1420. Step 1415 may be followed by step 1415 or 1425.

Figure 15:
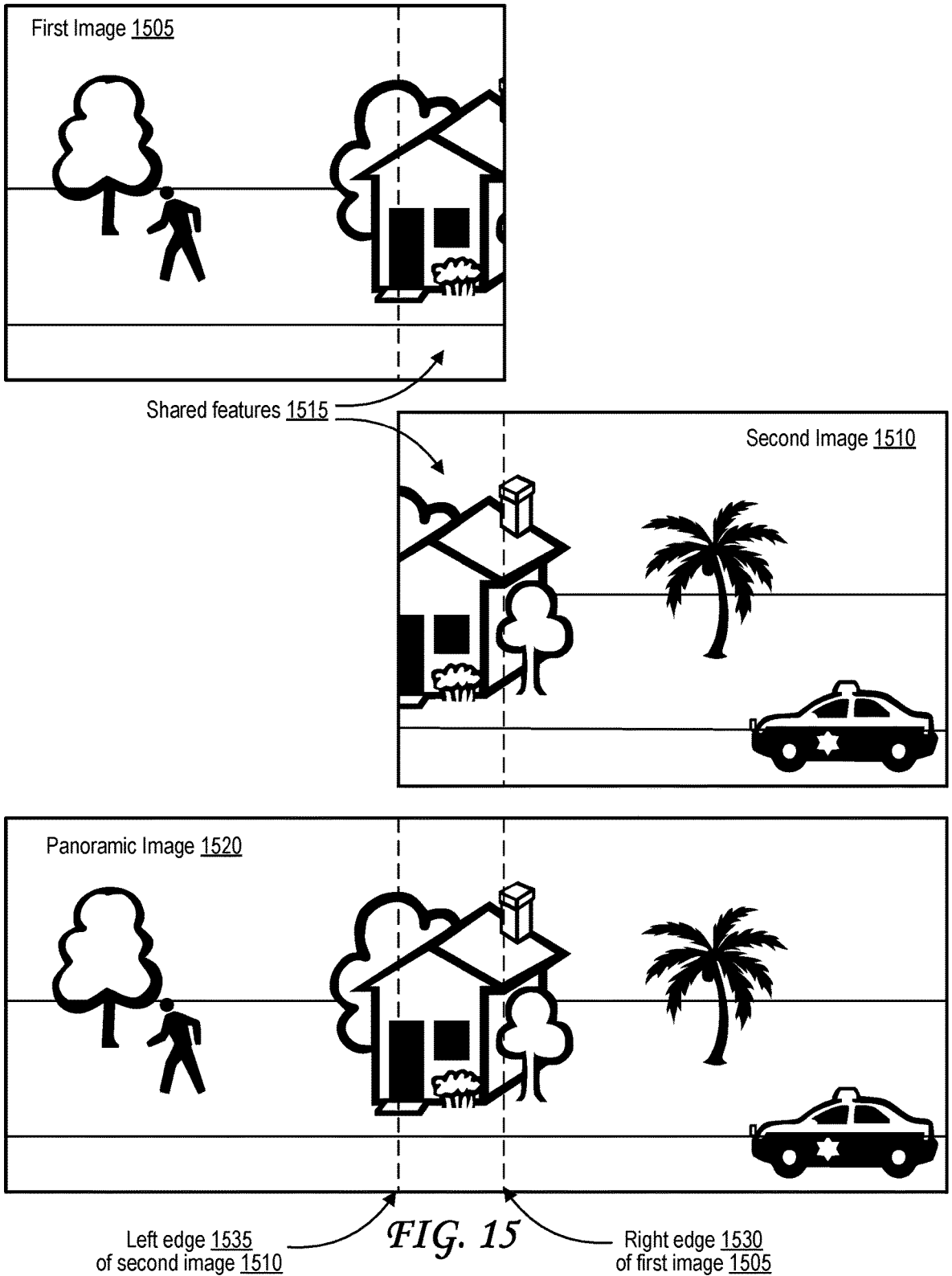
FIG. 15 illustrates an example of panoramic stitching.

At step 1425, the mobile device 100 captures a plurality of images using one or more cameras 110 of the camera module 105 while the camera module 105 is in the extended state. At step 1430, the mobile device 100 stitches the plurality of images into a panoramic image. An example of stitching is illustrated in FIG. 15. At optional step 1435, the mobile device 100 stitches the plurality of images into a 360 degree panoramic image that includes image data corresponding to at least a 360 degree area around the camera module. Stitching together the 360 degree panoramic image may result in a panoramic image that loops back around on itself, such that the leftmost portion of the image depicts the same content as the rightmost content of the image, and may stitch these portions together as well. Thus, if the panoramic image is viewed by a user wearing a virtual reality headset as discussed further herein, the user wearing the headset may spin in circles indefinitely and will always see a portion of the 360 degree panoramic image. A 360 degree panoramic image may optionally include visual data up above the viewer and/or down below the viewer, or in some cases may include gaps in visual data in these areas. Either of steps 1430 or 1435 may be followed by step 1425 (if another panorama is to be generated), step 1440, or step 1445.

At optional step 1440, the mobile device 100 activates a second mechanism that moves the camera module 105 of the mobile device 100 from the extended state to the retracted state. At optional step 1445, the mobile device 100 receives the camera module of the mobile device into the recess 220 in the housing 215 of the mobile device 100 in response to (or otherwise after) capturing the plurality of images, thereby transitioning the camera module 105 from the extended state to the retracted state. Optional steps 1440 and 1445 may be followed by step 1410.

In some cases, additional steps (not illustrated) may be performed after any of steps 1430, 1435, 1440, or 1445. For example, the mobile device may be a wireless communication device, such as a cellular telephone, and may therefore include at least one wireless communication transceiver. The mobile device may use the wireless communication transceiver to transmit the panoramic image to a computing device, optionally after performing additional image processing or formatting of the panoramic image. The computing device may be a device that is used to format and/or display the panoramic image, such as a television, a media center device connected to a television, a media projector, a virtual reality headset, an augmented reality headset, a portable video game console, a home video game console, a server, a cellular telephone, a wireless communication device. The panoramic image may be viewed by the mobile device that generates the panoramic image at step 1430 and/or by another computing device that receives the panoramic image from the mobile device or an intermediary device. For example, the mobile device may transmit the panoramic image to a server of a social media platform, a server of a network-based file sharing service, a server of a blogging service, or some other server, and another computing device may download or otherwise view the panoramic image from the server, optionally after the panoramic image has been formatted or otherwise processed at the server.

In some cases, viewing of the panoramic image may be tied to motion of a viewing device. For example, if the panoramic image is viewed on a virtual reality or augmented reality headset, then a wearer of the headset may only see a portion of the panoramic image at any given time, and the user may tilt or move his/her head in different directions to change what portion of the panoramic image he/she is viewing. In such cases, the wearer of the headset may tilt or move their head to the left to see more of the panoramic image to the left of their current view, may tilt or move their head to the right to see more of the panoramic image to the right of their current view, may tilt or move their head up to see more of the panoramic image up above their current view, may tilt or move their head down to see more of the panoramic image down below their current view, or some combination thereof. Viewers using handheld viewing devices (e.g., cellular telephones) or viewing devices with handheld remotes or controllers (e.g., televisions or home video game consoles) may similarly tilt and/or move their viewing devices, remotes, and/or controllers to similarly move a viewing angle of the panoramic image. Such tilt or movement based viewing controls may rely on one or more sensors, such as one or more accelerometers and/or one or more gyroscopes and/or one or more inertial measurement units (IMUs), to recognize tilting and/or movement of the viewing device and/or remote and/or controller. In some cases, touchscreens or touch-sensitive surfaces of viewing devices, remotes, and/or controllers may similarly allow a user to move the portion of the panoramic image being viewed in a tactile manner.

In some examples, the processes 1300 and 1400 may be performed by a computing device or apparatus. The computing device can include any suitable device, such as a mobile device (e.g., a mobile phone), a wearable device, a server (e.g., in a software as a service (SaaS) system or other server-based system), and/or any other computing device with the resource capabilities to perform the processes 1300 and/or 1400. For example, the computing device can be the mobile device 100. In some cases, the computing device can include the computing device architecture 1600 shown in FIG. 16. In one example, the processes 1300 and 1400 can be performed by the mobile device 100, which can include the components of the computing device architecture 1600. In some cases, the computing device or apparatus may include various components, such as one or more input devices, a camera module (e.g., camera module 105 including camera(s) 110, motor(s) 112, and retraction and/or extension mechanism 115), one or more memory devices (e.g., memory 140), one or more output devices (e.g., a display such as display 150, a speaker, and/or other output device(s)), one or more processors, one or more microprocessors, one or more microcomputers, one or more network interfaces configured to communicate and/or receive data, any combination thereof, and/or other component(s) that are configured to carry out the steps of processes 1300 and 1400. The network interface may be configured to communicate and/or receive Internet Protocol (IP) based data or other type of data over any suitable wired or wireless network (e.g., a WiFi network, a cellular broadband network, the Internet, a Bluetooth™ network, and/or any other type of wireless network).

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

Processes 1300 and 1400 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1300 and 1400 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 15 illustrates an example of panoramic stitching. A first image 1505 depicts a deciduous tree, a pedestrian, and a left side of a house. A second image 1510 depicts a right side of the house, a palm tree, and a police car. The first image 1505 and the second image 1510 both depict shared features indicated by dashed lines in both the first image 1505 and the second image 1510. The shared features 1515 include a portion of the house that is depicted in both the first image 1505 and the second image 1510. To stitch the first image 1505 and the second image 1510 together into the panoramic image 1520, the two images are overlaid and merged based on their shared features 1515. For example, the first image 1505 and the second image 1510 are overlaid so that the door of the house, the window of the house, and the roof apex of the house are aligned in the first image 1505 and the second image 1510. The result is the panoramic image 1520, which depicts the deciduous tree, the pedestrian, the entire house, the palm tree, and the police car. Two dashed lines are illustrated on the panoramic image 1520, the leftmost dashed line representing the left edge 1535 of the second image 1510, and the rightmost dashed line representing the right edge 1530 of the first image 1505. The space between the leftmost dashed line and the rightmost dashed line is also the space that includes the shared features 1515 that were used to achieve the stitching of the panoramic image. While only two images are stitched together in FIG. 15, the same techniques may be used for any number of images. Shared features 1515 may be any easily recognizable visual features, such as corners, edges, areas in which colors change, areas with high contrast changes, or some combination thereof.

FIG. 16 is a diagram illustrating an example of a system for implementing certain aspects of the present technology. In particular, FIG. 16 illustrates an example of computing system 1600, which can be for example any computing device making up internal computing system, a remote computing system, a camera, or any component thereof in which the components of the system are in communication with each other using connection 1605. Connection 1605 can be a physical connection using a bus, or a direct connection into processor 1610, such as in a chipset architecture. Connection 1605 can also be a virtual connection, networked connection, or logical connection.

In some embodiments, computing system 1600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1600 includes at least one processing unit (CPU or processor) 1610 and connection 1605 that couples various system components including system memory 1615, such as read-only memory (ROM) 1620 and random access memory (RAM) 1625 to processor 1610. Computing system 1600 can include a cache 1612 of high-speed memory connected directly with, in close proximity to, or integrated as part of processor 1610.

Processor 1610 can include any general purpose processor and a hardware service or software service, such as services 1632, 1634, and 1636 stored in storage device 1630, configured to control processor 1610 as well as a special-purpose processor where software instructions are incorporated into the actual processor design. Processor 1610 may essentially be a completely self-contained computing system, containing multiple cores or processors, a bus, memory controller, cache, etc. A multi-core processor may be symmetric or asymmetric.

To enable user interaction, computing system 1600 includes an input device 1645, which can represent any number of input mechanisms, such as a microphone for speech, a touch-sensitive screen for gesture or graphical input, keyboard, mouse, motion input, speech, etc. Computing system 1600 can also include output device 1635, which can be one or more of a number of output mechanisms known to those of skill in the art. In some instances, multimodal systems can enable a user to provide multiple types of input/output to communicate with computing system 1600. Computing system 1600 can include communications interface 1640, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1640 may also include one or more Global Navigation Satellite System (GNSS) receivers or transceivers that are used to determine a location of the computing system 1600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1630 can include software services, servers, services, etc., that when the code that defines such software is executed by the processor 1610, it causes the system to perform a function. In some embodiments, a hardware service that performs a particular function can include the software component stored in a computer-readable medium in connection with the necessary hardware components, such as processor 1610, connection 1605, output device 1635, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing image data, the method comprising:
    activating an actuator that moves a camera module of a mobile device in a movement direction from a retracted state to an extended state, wherein the camera module is retracted into a housing of the mobile device in the retracted state, wherein the camera module extends from the housing of the mobile device in the extended state, wherein the camera module includes a first camera facing a first direction that is perpendicular to the movement direction and a second camera facing a second direction that is perpendicular to the movement direction and opposing the first direction, wherein the first camera has a first field of view (FOV) in the retracted state and a second FOV, of a same size as the first FOV, in the extended state, wherein the second FOV is shifted from the first FOV in the movement direction;
    capturing a plurality of images using one or more cameras of the camera module while the camera module is in the extended state, the one or more cameras including at least the first camera and the second camera; and
    stitching the plurality of images into a panoramic image.

2. The method of claim 1, wherein the panoramic image is a 360 degree image that includes image data corresponding to at least a 360 degree area around the camera module.

3. The method of claim 1, further comprising:
    activating a motor while the camera module is in the extended state, wherein the motor rotates a portion of the camera module about an axis parallel to the movement direction, wherein the portion of the camera module includes the first camera, wherein a first image of the plurality of images is captured by the first camera while the portion of the camera module is at a first rotation orientation, and wherein a second image of the plurality of images is captured by the first camera while the portion of the camera module is at a second rotation orientation different from the first rotation orientation.

4. The method of claim 1, wherein the first camera of the one or more cameras of the camera module includes at least one of a wide-angle lens, an ultra-wide-angle lens, or a fisheye lens.

5. The method of claim 1, wherein the camera module folds from an unfolded state in the retracted state to a folded state in the extended state, and wherein the camera direction of the first camera in the unfolded state differs from the camera direction in the folded state.

6. The method of claim 1, further comprising:
transitioning, after capturing the plurality of images, the camera module from the extended state to the retracted state by causing the camera module to be retracted into the housing of the mobile device.

7. The method of claim 1, further comprising:
activating a second actuator that moves the camera module of the mobile device from the extended state to the retracted state.

8. The method of claim 1, wherein the actuator includes a spring, and wherein activating the actuator includes causing the spring to expand from a condensed state.

9. The method of claim 1, wherein the actuator includes a motor, wherein activating the actuator includes actuating the motor, and wherein actuation of the motor moves the camera module from the retracted state to the extended state.

10. The method of claim 1, further comprising transmitting the panoramic image to a computing device via a wireless communication transceiver.

11. An apparatus for processing images, the apparatus comprising:
a housing with a recess;
an actuator that moves a camera module in a movement direction from a retracted state to an extended state, wherein the camera module is retracted into the recess in the retracted state, wherein the camera module extends from the housing in the extended state;
the camera module, wherein the camera module includes one or more cameras that capture a plurality of images while the camera module is in the extended state, wherein the one or more cameras include a first camera facing a first direction that is perpendicular to the movement direction and a second camera facing a second direction that is perpendicular to the movement direction and opposing the first direction, wherein the first camera has a first field of view (FOV) in the retracted state and a second FOV, of a same size as the first FOV, in the extended state, wherein the second FOV is shifted from the first FOV in the movement direction;
one or more memory components that store instructions; and
one or more processors, wherein execution of the instructions by the one or more processors causes the one or more processors to stitch the plurality of images into a panoramic image.

12. The apparatus of claim 11, wherein the panoramic image is a 360 degree image that includes image data corresponding to at least a 360 degree circular area around the camera module.

13. The apparatus of claim 11, further comprising:
a motor, wherein the motor is configured to rotate a portion of the camera module in the extended state about an axis parallel to the movement direction, wherein the portion of the camera module includes the first camera, wherein a first image of the plurality of images is captured by the first camera while the portion of the camera module is at a first rotation orientation, and wherein a second image of the plurality of images is captured by the first camera while the portion of the camera module is at a second rotation orientation different from the first rotation orientation.

14. The apparatus of claim 11, wherein the first camera of the one or more cameras of the camera module includes at least one of a wide-angle lens, an ultra-wide-angle lens, or a fisheye lens.

15. The apparatus of claim 11, wherein the camera module folds from an unfolded state in the retracted state to a folded state in the extended state, and wherein the camera direction of the first camera in the unfolded state differs from the camera direction in the folded state.

16. The apparatus of claim 11, wherein the actuator is configured to, after capturing the plurality of images, transition the camera module from the extended state to the retracted state by causing the camera module to be retracted into the housing.

17. The apparatus of claim 11, further comprising a second actuator that that moves the camera module from the extended state to the retracted state.

18. The apparatus of claim 11, wherein the actuator includes a spring, and wherein activating the actuator includes causing the spring to expand from a condensed state.

19. The apparatus of claim 11, wherein the actuator includes a motor, wherein activating the actuator includes actuating the motor, and wherein actuation of the motor moves the camera module from the retracted state to the extended state.

20. The apparatus of claim 11, further comprising a wireless communication transceiver that transmits the panoramic image to a computing device.

21. A non-transitory computer-readable medium is provided having stored thereon instructions that, when executed by one or more processors, cause the one or more processors to:
activate an actuator that moves a camera module in a movement direction from a retracted state to an extended state, wherein the camera module is retracted into a housing while in the retracted state, wherein the camera module extends from the housing in the extended state, wherein the camera module includes a first camera facing a first direction that is perpendicular to the movement direction and a second camera facing a second direction that is perpendicular to the movement direction and opposing the first direction, wherein the first camera has a first field of view (FOV) in the retracted state and a second FOV, of a same size as the first FOV, in the extended state, wherein the second FOV is shifted from the first FOV in the movement direction;
capture a plurality of images using one or more cameras of the camera module while the camera module is in the extended state, the one or more cameras including at least the first camera and the second camera; and
stitch the plurality of images into a panoramic image.

22. The non-transitory computer-readable medium of claim 21, further comprising instructions that, when executed by the one or more processors, cause the one or more processors to:
activate a motor while the camera module is in the extended state, wherein the motor rotates a portion of the camera module about an axis parallel to the movement direction, wherein the portion of the camera module includes the first camera, wherein a first image of the plurality of images is captured by the first camera while the portion of the camera module is at a first rotation orientation, and wherein a second image of the plurality of images is captured by the first camera while the portion of the camera module is at a second rotation orientation different from the first rotation orientation.

23. The non-transitory computer-readable medium of claim 21, wherein the camera module folds from an unfolded state in the retracted state to a folded state in the extended state, and wherein the camera direction of the first camera in the unfolded state differs from the camera direction in the folded state.

* * * * *